US011457282B2

(12) United States Patent
Borawski et al.

(10) Patent No.: US 11,457,282 B2
(45) Date of Patent: *Sep. 27, 2022

(54) METHODS AND APPARATUS TO CREATE A PANEL OF MEDIA DEVICE USERS

(71) Applicant: The Nielsen Company (US), LLC, New York, NY (US)

(72) Inventors: Albert T. Borawski, Oldsmar, FL (US); Stephen S. Bell, Schaumburg, IL (US); Oana Dan, New York, NY (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/195,365

(22) Filed: Mar. 8, 2021

(65) Prior Publication Data
US 2021/0297744 A1    Sep. 23, 2021

Related U.S. Application Data

(63) Continuation of application No. 16/544,875, filed on Aug. 19, 2019, now Pat. No. 10,945,043, which is a (Continued)

(51) Int. Cl.
*H04N 21/475* (2011.01)
*H04L 29/08* (2006.01)
(Continued)

(52) U.S. Cl.
CPC ........ *H04N 21/4755* (2013.01); *H04H 60/31* (2013.01); *H04H 60/45* (2013.01);
(Continued)

(58) Field of Classification Search
CPC ........ H04N 21/4755; H04N 21/41407; H04N 21/44222; H04N 21/4516; H04N 21/4667;
(Continued)

(56) References Cited

U.S. PATENT DOCUMENTS 5,812,398 A    9/1998 Nielsen
6,038,320 A    3/2000 Miller
(Continued)

FOREIGN PATENT DOCUMENTS

AU    2015227441    3/2016
AU    2016228288    9/2016
(Continued)

OTHER PUBLICATIONS

IP Australia, "Examination Report No. 1," issued in connection with Australian Patent Application No. 2015227441, dated Nov. 14, 2016, 5 pages.
(Continued)

*Primary Examiner* — Esther B. Henderson
*Assistant Examiner* — Nazia Naoreen
(74) *Attorney, Agent, or Firm* — Hanley, Flight & Zimmerman, LLC

(57) ABSTRACT

Methods and apparatus to create a panel of media device users are disclosed. An example apparatus includes an interface to receive a unique identifier and an application identifier from a media device executing an instrumented application. A panel creator is to create a master frame corresponding to media devices that have executed the instrumented application. A registration data controller is to: (i) determine a skip rate, (ii) assign the media device from the master frame into a first test cell based on a random value and the skip rate, (iii) select a first recruitment interface associated with the first test cell, and (iv) instruct the instrumented application to, in response to the instrumented application being executed for a first time after a threshold period of time since an initial execution of the instrumented application has elapsed, display the first recruitment interface.

20 Claims, 12 Drawing Sheets

Related U.S. Application Data continuation of application No. 15/388,809, filed on Dec. 22, 2016, now Pat. No. 10,390,094, which is a continuation of application No. 14/145,452, filed on Dec. 31, 2013, now Pat. No. 9,560,149.

(60) Provisional application No. 61/815,597, filed on Apr. 24, 2013.

(51) Int. Cl.
| | |
|---|---|
| H04L 29/06 | (2006.01) |
| H04N 21/414 | (2011.01) |
| H04N 21/466 | (2011.01) |
| H04H 60/45 | (2008.01) |
| H04N 21/442 | (2011.01) |
| H04N 21/45 | (2011.01) |
| H04N 21/61 | (2011.01) |
| H04H 60/31 | (2008.01) |
| H04L 65/611 | (2022.01) |
| H04L 67/50 | (2022.01) |
| H04L 67/025 | (2022.01) |
| H04L 67/306 | (2022.01) |
| H04W 4/60 | (2018.01) |
| H04N 21/81 | (2011.01) |

(52) U.S. Cl.
CPC .......... H04L 65/611 (2022.05); H04L 67/025 (2013.01); H04L 67/306 (2013.01); H04L 67/535 (2022.05); H04N 21/41407 (2013.01); H04N 21/44226 (2020.08); H04N 21/4516 (2013.01); H04N 21/4667 (2013.01); H04N 21/6125 (2013.01); H04N 21/812 (2013.01); H04W 4/60 (2018.02)

(58) Field of Classification Search
CPC .... H04N 21/6125; H04H 60/31; H04H 60/45; H04L 65/4076; H04L 67/025; H04L 67/22; H04L 67/306
See application file for complete search history.

(56) References Cited

U.S. PATENT DOCUMENTS

| | | | |
|---|---|---|---|
| 6,052,730 A | 4/2000 | Felciano et al. | |
| 6,081,262 A | 6/2000 | Gill et al. | |
| 6,108,637 A | 8/2000 | Blumenau | |
| 6,112,240 A | 8/2000 | Pogue et al. | |
| 6,253,203 B1 | 6/2001 | O'Flaherty et al. | |
| 6,792,615 B1 | 9/2004 | Rowe et al. | |
| 6,873,688 B1 | 3/2005 | Aarnio | |
| 6,931,111 B1 | 8/2005 | Coffee | |
| 7,127,305 B1 | 10/2006 | Palmon | |
| 7,167,842 B1 | 1/2007 | Josephson, II et al. | |
| 7,260,837 B2 | 8/2007 | Abraham et al. | |
| 7,323,991 B1 | 1/2008 | Eckert et al. | |
| 7,386,625 B2 | 6/2008 | D' Aviera | |
| 7,493,655 B2 | 2/2009 | Brown | |
| 7,587,732 B2 | 9/2009 | Wright et al. | |
| 7,729,940 B2 | 6/2010 | Harvey et al. | |
| 7,917,440 B2 | 3/2011 | Lau et al. | |
| 7,930,285 B2 | 4/2011 | Abraham et al. | |
| 8,000,993 B2 | 8/2011 | Harvey et al. | |
| 8,112,301 B2 | 2/2012 | Harvey et al. | |
| 8,302,139 B2 | 10/2012 | Harris | |
| 8,370,489 B2 | 2/2013 | Mazumdar et al. | |
| 8,387,084 B1 | 2/2013 | Klappert et al. | |
| 8,607,295 B2 | 12/2013 | Bhatia et al. | |
| 8,635,334 B2 | 1/2014 | Malloy et al. | |
| 8,788,655 B2 | 7/2014 | Dare et al. | |
| 8,819,109 B1 | 8/2014 | Krishnamurthy et al. | |
| 9,253,167 B2 | 2/2016 | Best et al. | |
| 9,288,118 B1 | 3/2016 | Pattan | |
| 9,301,019 B1 * | 3/2016 | Arini | H04N 21/6582 |
| 9,503,536 B2 | 11/2016 | Bosworth et al. | |
| 9,510,049 B2 | 11/2016 | Zimmerman | |
| 9,560,149 B2 | 1/2017 | Borawski et al. | |
| 2002/0128908 A1 | 9/2002 | Levin et al. | |
| 2003/0126146 A1 | 7/2003 | Van Der Riet | |
| 2003/0177488 A1 | 9/2003 | Smith et al. | |
| 2004/0088212 A1 | 5/2004 | Hill | |
| 2004/0252816 A1 | 12/2004 | Nicolas | |
| 2005/0226642 A1 | 10/2005 | Rodriguez et al. | |
| 2006/0203106 A1 | 9/2006 | Lawerence et al. | |
| 2008/0062895 A1 | 3/2008 | Chapman et al. | |
| 2008/0263632 A1 | 10/2008 | Keon | |
| 2008/0306782 A1 | 12/2008 | Ephrati | |
| 2009/0034606 A1 | 2/2009 | MacInnis | |
| 2009/0187939 A1 | 7/2009 | Lajoie | |
| 2009/0307061 A1 | 12/2009 | Monighetti et al. | |
| 2010/0145954 A1 | 6/2010 | Barlin et al. | |
| 2010/0197326 A1 | 8/2010 | Ngo | |
| 2011/0010470 A1 | 1/2011 | Hulbert et al. | |
| 2011/0072039 A1 | 3/2011 | Tayloe | |
| 2011/0087530 A1 | 4/2011 | Fordyce, III et al. | |
| 2011/0088059 A1 | 4/2011 | Wilson et al. | |
| 2011/0093324 A1 | 4/2011 | Fordyce, III et al. | |
| 2011/0093335 A1 | 4/2011 | Fordyce, III et al. | |
| 2011/0153391 A1 | 6/2011 | Tenbrock | |
| 2011/0179204 A1 | 7/2011 | Hulbert et al. | |
| 2011/0246641 A1 | 10/2011 | Pugh et al. | |
| 2011/0264501 A1 | 10/2011 | Clyne | |
| 2011/0264567 A1 | 10/2011 | Clyne | |
| 2011/0289037 A1 | 11/2011 | Tullio et al. | |
| 2012/0042367 A1 | 2/2012 | Papakostas et al. | |
| 2012/0078727 A1 | 3/2012 | Lee | |
| 2012/0095861 A1 | 4/2012 | Feng et al. | |
| 2012/0118947 A1 | 5/2012 | Lyons et al. | |
| 2012/0209949 A1 | 8/2012 | Deliyannis et al. | |
| 2012/0260280 A1 | 10/2012 | Harsh et al. | |
| 2012/0290950 A1 | 11/2012 | Rapaport et al. | |
| 2013/0007794 A1 | 1/2013 | Besehanic et al. | |
| 2013/0014145 A1 | 1/2013 | Bhatia et al. | |
| 2013/0104038 A1 | 4/2013 | Galper et al. | |
| 2013/0111511 A1 | 5/2013 | Besehanic | |
| 2013/0145022 A1 | 6/2013 | Srivastava et al. | |
| 2013/0198383 A1 | 8/2013 | Tseng et al. | |
| 2013/0198512 A1 | 8/2013 | Rubin et al. | |
| 2013/0205311 A1 | 8/2013 | Ramaswamy et al. | |
| 2013/0219426 A1 | 8/2013 | Zweig et al. | |
| 2013/0326554 A1 | 12/2013 | Shkedi | |
| 2014/0040171 A1 | 2/2014 | Segalov et al. | |
| 2014/0074592 A1 | 3/2014 | Van Elsas et al. | |
| 2014/0074859 A1 | 3/2014 | Swaminathan et al. | |
| 2014/0081750 A1 | 3/2014 | Hosp | |
| 2014/0110468 A1 | 4/2014 | Kandregula | |
| 2014/0149586 A1 | 5/2014 | Clapp et al. | |
| 2014/0149588 A1 | 5/2014 | DeHaas et al. | |
| 2014/0176443 A1 | 6/2014 | Farag et al. | |
| 2014/0215050 A1 | 7/2014 | Lu | |
| 2014/0236737 A1 * | 8/2014 | Rowe | H04H 60/372 705/14.68 |
| 2014/0244352 A1 | 8/2014 | Fordyce, III et al. | |
| 2014/0244828 A1 | 8/2014 | Besehanic | |
| 2014/0244848 A1 | 8/2014 | Lynch | |
| 2014/0259032 A1 | 9/2014 | Zimmerman | |
| 2014/0278934 A1 | 9/2014 | Gutierrez | |
| 2014/0280874 A1 | 9/2014 | Bosworth et al. | |
| 2014/0280888 A1 | 9/2014 | McMillan | |
| 2014/0325057 A1 | 10/2014 | Borawski et al. | |
| 2015/0052245 A1 | 2/2015 | McMillan | |
| 2015/0186536 A1 | 7/2015 | Bosworth et al. | |
| 2015/0227441 A1 | 8/2015 | Pawlowski | |
| 2016/0078459 A1 | 3/2016 | Borland et al. | |
| 2017/0041410 A1 | 2/2017 | Bosworth et al. | |
| 2017/0105047 A1 | 4/2017 | Borawski et al. | |
| 2019/0373327 A1 | 12/2019 | Borowski et al. | |

FOREIGN PATENT DOCUMENTS

| | | |
|---|---|---|
| CN | 102289758 | 12/2011 |
| CN | 105450724 | 3/2016 |

(56) References Cited

FOREIGN PATENT DOCUMENTS

| EP | 2278543 | 1/2011 |
|---|---|---|
| EP | 2998919 | 3/2016 |
| HK | 1223210 | 7/2017 |
| KR | 20010039360 | 5/2001 |
| WO | 2005071961 | 8/2005 |
| WO | 2006017624 | 2/2006 |
| WO | 2012128895 | 9/2012 |
| WO | 2012177872 | 12/2012 |
| WO | 2013119649 | 8/2013 |
| WO | 2013119654 | 8/2013 |
| WO | 2014160332 | 10/2014 |
| WO | 2014176442 | 10/2014 |
| WO | 2014176443 | 10/2014 |
| WO | 2015102796 | 7/2015 |

OTHER PUBLICATIONS

United States Patent and Trademark Office, "Notice of Allowance," issued in connection with U.S. Appl. No. 13/828,971, dated Dec. 23, 2015, 11 pages.
United States Patent and Trademark Office, "Notice of Allowance," issued in connection with U.S. Appl. No. 13/828,971, dated Jul. 29, 2016, 8 pages.
United States Patent and Trademark Office, "Supplemental Notice of Allowability," issued in connection with U.S. Appl. No. 13/828,971, dated Oct. 6, 2016, 4 pages.
United States Patent and Trademark Office, "Non-Final Office Action," issued in connection with U.S. Appl. No. 15/299,139, dated Apr. 21, 2017, 26 pages.
IP Australia, "Examination Report No. 1," issued in connection with Australian Patent Application No. 2016228288, dated Jun. 5, 2017, 4 pages.
IP Australia, "Certificate of Grant Standard Patent," issued in connection with Australian Patent Application No. 2015227441, dated Sep. 17, 2014, 1 page.
United States Patent and Trademark Office, "Non-Final Office Action," issued in connection with U.S. Appl. No. 14/489,390, dated Sep. 8, 2017, 21 pages.
IP Australia, "Notice of Acceptance of Patent Application," issued in connection with Australian Patent Application No. 2016228288, dated Sep. 28, 2017, 3 pages.
European Patent Office, "Examination Report," issued in connection to European Patent Application No. 15002701.9, dated Oct. 2, 2017, 4 pages.
United States Patent and Trademark Office, "Non-Final Office Action," issued in connection with U.S. Appl. No. 15/299,139, dated Nov. 9, 2017, 51 pages.
IP Australia, "Notice of Acceptance for Patent Application," issued in connection with Australian Patent Application No. 2015227441, dated Mar. 28, 2017, 3 pages.
United States Patent and Trademark Office, "Non-final Office Action," issued in connection with U.S. Appl. No. 14/145,452, dated May 11, 2016, 13 pages.
United States Patent and Trademark Office, "Notice of Allowance," issued in connection with U.S. Appl. No. 14/145,452, dated Sep. 27, 2016, 8 pages.
United States Patent and Trademark Office, "Non-Final Office Action," issued in connection with U.S. Appl. No. 13/828,971, dated Feb. 13, 2015, 10 pages.
Patent Cooperation Treaty, "International Search Report," issued in connection to International Patent Application No. PCT/US2014/068353, dated Feb. 26, 2015, 3 pages.
Patent Cooperation Treaty, "Written Opinion," issued in connection to International Patent Application No. PCT/US2014/068353, dated Feb. 26, 2015, 6 pages.
United States Patent and Trademark Office, "Non-Final Office Action," issued in connection with U.S. Appl. No. 13/836,096, dated Apr. 24, 2015, 15 pages.
IP Australia, "Patent Examination Report No. 1," issued in connection with Australian Patent Application No. 2013204917, dated Mar. 24, 2015, 5 pages.
IP Australia, "Patent Examination Report No. 1," issued in connection with Australian Patent Application No. 2013204913, dated May 5, 2015, 4 pages.
United States Patent and Trademark Office, "Non-Final Office Action," issued in connection with U.S. Appl. No. 14/527,283, dated Jun. 5, 2015, 14 pages.
Dodson, "PBS Comest to Apple TV, Are the Networks Next?" TVNewsCheck, retrieved Jan. 19, 2015, 3 pages.
Microsoft, "Microsoft and National White Collar Crime Center Make Digital Forensics Tool Available to U.S. Law Enforement Agencies," Oct. 13, 2009, 2 pages.
Gaines, "Under the Hood with Visits and Visitors," Omniture: Industry Insights, Mar. 24, 2009, retrieved on Aug. 4, 2009, 8 pages.
Fleishman, "Web Log Analysis: Who's Doing What, When?" Web Log Analysis, Web Developer Magazine, vol. 2, No. 2., May/Jun. 1996, 3 pages.
Netscape, "Appendix C Netscape Cookies," [http://web.archive.org/web/20000511223725/developer.netscape.com/docs/manuals/], retrieved Aug. 11, 2004, 6 pages.
Fenton, "How to Uniquely Identify User's PC Without Using IP Address?" [http://openacs.org/forums/message-view?message_id=118673], Open ACS, retrieved on Nov. 5, 2012, 3 pages.
International Searching Authority, "International Search Report and Written Opinion," issued in connection with International Patent Application No. PCT/US2014/026016, dated Jul. 11, 2014, 13 pages.
International Searching Authority, "Search Report and Written Opinion," issued in connection with International Patent Application No. PCT/US2014/026336, dated Jul. 17, 2014, 14 pages.
International Searching Authority, "Search Report and Written Opinion," issued in connection with International Patent Application No. PCT/US2014/035331, dated Aug. 21, 2014, 11 pages.
United States Patent and Trademark Office, "Final Office Action," issued in connection with U.S. Appl. No. 13/828,971, dated Aug. 27, 2015, 12 pages.
International Bureau, "International Preliminary Report on Patentability," issued in connection with International Patent Application No. PCT/US2014/026016, dated Sep. 24, 2015, 10 pages.
United States Patent and Trademark Office, "Final Office Action," issued in connection with U.S. Appl. No. 14/527,283, dated Oct. 21, 2015, 12 pages.
United States Patent and Trademark Office, "Final Office Action," issued in connection with U.S. Appl. No. 13/836,096, dated Nov. 18, 2015, 16 pages.
Korean Patent Office, "Notice of Preliminary Rejection," issued in connection with Korean Patent Application No. 15002701.9, dated Nov. 13, 2015, 12 pages.
European Patent Office, "Search Report," issued in connection with European Patent Application No. 15002701.9, dated Nov. 6, 2015, 7 pages.
United States Patent and Tradmark Office, "Notice of Allowance," issued in connection with U.S. Appl. No. 13/828,971, dated Dec. 23, 2015, 21 pages.
Canadian Intellectual Property Office, "Office Action," issued in connection with Canadian Application No. 2,875,218, dated Jan. 26, 2016, 5 pages.
United States Patent and Trademark Office, "Non-Final Office Action," issued in connection with U.S. Appl. No. 14/527,283, dated Mar. 3, 2016, 20 pages.
Japanese Patent Office, "Notice of Reasons for Rejections," issued in connection with Japanese Patent Application No. P2015-525651, dated Mar. 15, 2016, 8 pages.
Takemori et al., "Management Techniques for Universally Unique Identifier for Applications in Smart Phone," IPSI SIG Technical Report, vol. 2012-CSEC-59, No. 8, Dec. 14, 2012, 10 pages.
Korean Patent Office, "Notice of Allowance," issued in connection with Korean Patent Application No. 10-2014-7034015, dated Jun. 14, 2016, 3 pages.

(56) References Cited

OTHER PUBLICATIONS

International Bureau, "Preliminary Report on Patentability," issued in connection with International Patent Application No. PCT/US2014/068353, dated Jul. 14, 2016, 8 pages.

United States Patent and Trademark Office, "Final Office Action," issued in connection with U.S. Appl. No. 14/527,283, dated Jul. 5, 2016, 19 pages.

United States Patent and Trademark Office, "Non-Final Office Action," issued in connection with U.S. Appl. No. 14/453,840, dated Jul. 5, 2016, 18 pages.

The State Intellectual Property Office of China, "First Notification of Office Action," issued in connection with Chinese Patent Application No. 201480001438, dated Aug. 26, 2016, 9 pages.

United States Patent and Trademark Office, "Final Office Action," issued in connection with U.S. Appl. No. 14/453,840, filed Jan. 5, 2017, 22 pages.

China National Intellectual Property Administration, "Third Notification of Office Action," issued in connection with Chinese Patent Application No. 201510723940.8, dated Jul. 5, 2019, 6 pages.

United States Patent and Trademark Office, "Final Office Action," issued in connection with U.S. Appl. No. 14/489,390, dated Apr. 12, 2018, 23 pages.

United States Patent and Trademark Office, "Non-Final Office Action," issued in connection with U.S. Appl. No. 14/489,390, dated Oct. 29, 2018, 27 pages.

United States Patent and Trademark Office, "Final Office Action," issued in connection with U.S. Appl. No. 14/489,390, dated Apr. 19, 2019, 35 pages.

United States Patent and Trademark Office, "Advisory Action," issued in connection with U.S. Appl. No. 14/489,390, dated Jul. 5, 2019, 3 pages.

United States Patent and Trademark Office, "Non-Final Office Action," issued in connection with U.S. Appl. No. 14/489,390, dated Nov. 21, 2019, 40 pages.

United States Patent and Trademark Office, "Notice of Panel Decision from Pre-Appeal Brief Review" issued in connection with U.S. Appl. No. 14/489,390, dated Oct. 29, 2019, 2 pages.

United States Patent and Trademark Office, "Final Office Action," issued in connection with U.S. Appl. No. 15/299,139, dated Jun. 15, 2018, 22 pages.

State Intellectual Property Office of China, "First Office Action," issued in connection with Chinese Patent Application No. CN201480001438.X, dated Aug. 26, 2016, 9 pages.

United States Patent and Trademark Office, "Non-Final Office Action," issued in connection with U.S. Appl. No. 16/278,603, dated Jul. 29, 2019, 10 pages.

United States Patent and Trademark Office, "Notice of Allowance," issued in connection with U.S. Appl. No. 16/278,603, dated Dec. 16, 2019, 9 pages.

Mexican Institute of Industrial Property, "Notice of Allowance," issued in connection with Mexican Application No. 2014014732, dated Jun. 26, 2017, 2 pages.

Chinese National Intellecutal Property Adminstration, "Notice of Allowance," issued in connection with Chinese Application No. 201510723940.8, dated Oct. 31, 2019, 5 pages.

China National Intellectual Property Adminstration, "Notice of Allowance," issued in connection with Chinese Application No. 201480001438.X, dated May 2, 2017, 4 pages.

Japanese Patent Office, "Notice of Allowance," issued in connection with Japanese Application No. 2015-525651, dated Dec. 6, 2016, 3 pages.

Mexican Institute of Industrial Property, "Office Action," issued in connection with Mexican Application No. 2014014732, dated Jun. 21, 2016, 2 pages.

Mexican Institute of Industrial Property, "Office Action," issued in connection with Mexican Application No. 2014014732, dated Sep. 23, 2016, 2 pages.

Mexican Institute of Industrial Property, "Office Action," issued in connection with Mexican Application No. 2014014732, dated Feb. 23, 2017, 3 pages.

United States Patent and Trademark Office, "Non-Final Office Action," issued in connection with U.S. Appl. No. 16/544,875, dated Jun. 2, 2020, 10 pages.

United States Patent and Trademark Office, "Notice of Allowance," issued in connection with U.S. Appl. No. 16/544,875, dated Oct. 30, 2020, 7 pages.

\* cited by examiner

500

| UNIQUE ID | APPLICATION ID | TIMESTAMP |
|---|---|---|
| 001 | ESPN | 12/28/2013 10:46AM |
| 001 | HBO GO | 12/28/2013 11:32AM |
| 002 | HULU | 12/29/2013 3:12PM |
| ... | ... | ... |

| UNIQUE ID | RECRUITMENT OFFER PRESENTED? | RECRUITMENT OFFER ACCEPTED? | DEMOGRAPHIC INFORMATION COLLECTED? |
|---|---|---|---|
| 001 | YES | YES | YES |
| 002 | YES | REFUSED | N/A |
| 003 | NO | N/A | N/A |
| 004 | NOT SELECTED | N/A | N/A |
| ... | ... | ... | ... |

| UNIQUE ID (510) | TEST CELL (720) |
|---|---|
| 001 | 1 |
| 002 | 2 |
| 003 | 1 |
| 004 | NOT SELECTED |
| ... | ... |

750 — 001 row
760 — 002 row
770 — 003 row
780 — 004 row

| TEST CELL (720) | RECRUITMENT INTERFACE LANGUAGE (825) | REQUEST ETHNICITY? (830) | REQUEST AGE? (835) | REQUEST FINANCIAL INFORMATION? (840) |
|---|---|---|---|---|
| 1 | Dear iPad User, ... | NO | YES | NO |
| 2 | CONGRATULATIONS! You have been selected... | YES | YES | NO |
| ... | ... | ... | ... | ... |

850 — row 1
860 — row 2

FIG. 8

METHODS AND APPARATUS TO CREATE A PANEL OF MEDIA DEVICE USERS

RELATED APPLICATION

This patent arises from a continuation of U.S. patent application Ser. No. 16/544,875, which was filed on Aug. 19, 2019, and was entitled "METHODS AND APPARATUS TO CREATE A PANEL OF MEDIA DEVICE USERS", which claims priority from U.S. patent application Ser. No. 15/388,809, which was filed on Dec. 22, 2016, and was entitled "METHODS AND APPARATUS TO CREATE A PANEL OF MEDIA DEVICE USERS", which claims priority from U.S. patent application Ser. No. 14/145,452, which was filed on Dec. 31, 2013, and was entitled "METHODS AND APPARATUS TO CREATE A PANEL OF MEDIA DEVICE USERS", which claims priority from U.S. Provisional Patent Application Ser. No. 61/815,597 which was filed on Apr. 24, 2013. U.S. patent application Ser. No. 15/388,809, U.S. patent application Ser. No. 14/145,452, and U.S. Provisional Patent Application Ser. No. 61/815,597 are hereby incorporated herein by reference in their entireties.

FIELD OF THE DISCLOSURE

This disclosure relates generally to audience measurement, and, more particularly, to methods and apparatus to create a panel of media device users.

BACKGROUND

In recent years, consumer devices have been provided with Internet connectivity and the ability to retrieve media from the Internet. As such, media exposure has shifted away from sole reliance on traditional methods of media access, such as broadcast television, towards accessing media via consumer devices accessing the Internet.

Media providers and/or other entities such as, for example, advertising companies, broadcast networks, etc. are often interested in the viewing, listening, and/or media behavior of audience members and/or the public in general. To monitor these behaviors, an audience measurement company may enlist panelists (e.g., persons agreeing to be monitored) to cooperate in an audience measurement study. The media usage and/or exposure habits of these panelists as well as demographic data about the panelists is collected and used to statistically determine the size and demographics of a larger audience of interest.

BRIEF DESCRIPTION OF THE DRAWINGS

FIG. 5 is an example table 500 representative of unique identifiers stored in association with application identifiers.

FIG. 6 is an example table 600 representative of recruitment information stored in association with a unique identifier.

FIG. 7 is an example table 700 representative of a unique identifier stored in association with a test cell.

FIG. 8 is an example table 800 representative of test cell information that may be stored by the central facility of FIG. 1.

The figures are not to scale. Wherever appropriate, the same reference numbers will be used throughout the drawing(s) and accompanying written description to refer to the same or like parts.

DETAILED DESCRIPTION

Figure 1:
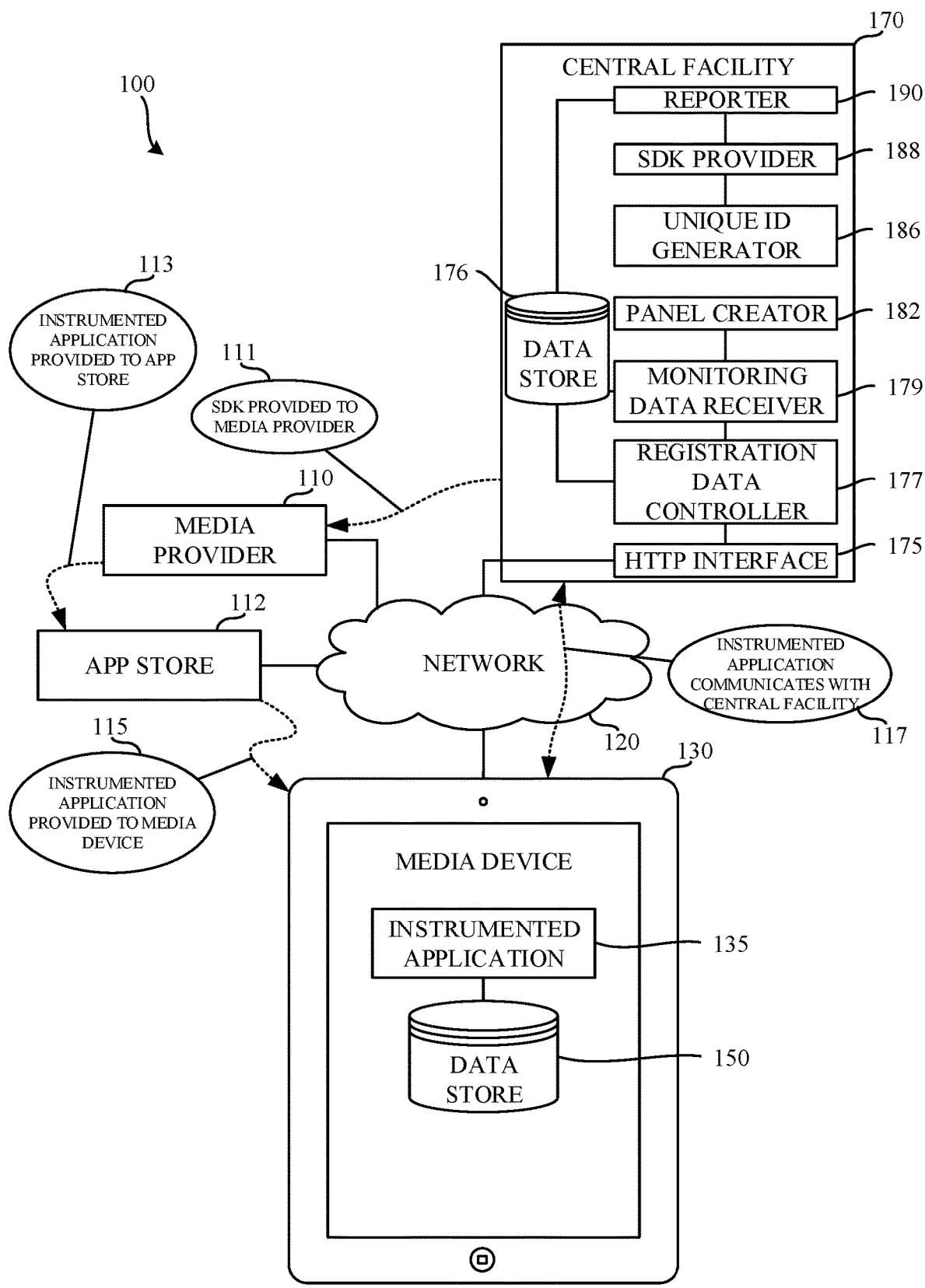
FIG. 1 is a block diagram illustrating an example system constructed in accordance with the teachings of this disclosure to monitor media presentations.

Monitoring companies desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Media devices such as tablet computers (e.g., an Apple iPad®, an Asus Transformer™, etc.) present media using applications (sometimes referred to as "apps") that access, retrieve, request, and/or present media (e.g., Internet media). Combining portability and ease of use with high-speed Internet capabilities and large screen sizes, tablets are good devices for watching media (e.g., video). Apple iPads® have some of the highest penetration in the tablet market, and a large and growing number of apps have been developed for the Apple iPad®. Many U.S. households own one or more Apple iPads®. By 2015, it is expected that over one-third of US Internet users will own an Apple iPad® and be able to stream video on it. Tablet ownership is not only growing in numbers, but also in demographic coverage, narrowing the age gap in media consumption. By some estimates, 36% of people aged 35-54 and 44% of people aged 55-64 use their tablets while watching TV. Tablets have also become loyal babysitters, playmates, teachers, and toys. Children in tablet-owning households use media devices such as an iPad® to watch TV shows and movies. Many different "Apps" exist and can be downloaded by users through app stores such as, for example, Apple iTunes®, Google Play®, etc. Hundreds, if not thousands, of apps are available in the app stores that enable presentation of media. Examples of such applications include, but are not limited to, Hulu®, Netflix®, HBO Go®, etc.

Operating systems used on media devices are often closed platforms. That is, the operating systems provide a limited set of functions that applications executed by the media device can access via, for example, an Application Programming Interface (API). In some operating systems, only a single application is executed at one time. When the media device executes the app, the app is typically run in a "sand-box." That is, the app is not allowed to communicate with other apps executed by the media device. In some examples, apps have access to a limited set of functionality for sharing data with other apps. For example, applications executed on the iOS operating system have access to a "pasteboard" that allows applications to share information.

Because communicating with applications to identify and/or monitor media presentation events on devices using a "sandbox" approach is difficult, in examples disclosed herein monitoring is enabled by adding monitoring capability to applications. In examples disclosed herein, a software development kit (SDK) is provided to application developers from, for example, an audience measurement entity. The SDK facilitates instrumenting and/or otherwise enabling applications (e.g., media applications (such as streaming video applications), news applications, browser applications, image applications, social media applications, games, etc.) with monitoring functionalities which are able to collect and transmit monitoring information to a monitoring entity. In particular, the application developers create apps that include media monitoring functionality using the SDK. Accordingly, rather than relying on a dedicated monitoring application installed on a panelist computer (e.g., a tablet, a laptop, a smartphone, etc.), instrumented applications disclosed herein are instrumented with instructions such that the instrumented applications effectively monitor themselves and/or user interaction(s) with the instrumented applications. In some examples, the instrumented application is referred to as a monitoring enabled application. Because the instrumented applications monitor themselves, the instrumented applications and/or the monitoring functionality provided by the SDK enables the instrumented application to, for example, request instructions on whether monitoring functionality should be enabled, request instructions on whether a user should be asked if they would like to join a panel, notify the audience measurement entity when an app and/or media associated with the app is presented, notify the audience measurement entity what media and/or app(s) is presented, notify the audience measurement entity how the apps and/or media is being presented (e.g., via a tablet display, via a television, etc.), notify the audience measurement entity of a duration of exposure of an app and/or media associated with the app, etc.

Consider for example, a media application instrumented with monitoring functionality. Assume the instrumented application has been downloaded to a media device (e.g., via purchase in an app store). During operation of the instrumented application, the instrumented application identifies whether monitoring functionality should be enabled (e.g., based on a monitoring instruction received from an audience measurement entity, based on the user's consent to be monitored, etc.). In examples disclosed herein, the instrumented application contacts the monitoring entity to determine whether monitoring should be enabled. In some examples, the instrumented application checks the shared memory location on the client device to determine whether monitoring should be enabled. When the instrumented application determines monitoring should be enabled, the instrumented application also retrieves a unique identifier (if present) associated with the media device. The unique identifier is used to associate the media activity of the media device with the user for audience measurement purposes.

Tablet applications enable new behaviors (e.g., the ability to watch streaming videos and/or television in different locations) and provide the ability to measure these behaviors. However, constructing a representative sample (e.g., a panel) to capture device-driven behaviors using cost-effective recruitment techniques is a challenge, given the scarcity of demographic data on this population, as well as the lack of prior research on recruitment from it.

Example sample constructions and recruitment approaches for building a panel of tablet users that view media via an instrumented application (e.g., an app) are disclosed herein. Monitoring components embedded in the instrumented application enable creation of a panel, obtaining their demographic characteristics, and electronically monitoring the panelists media usage behavior.

Example instrumented applications disclosed herein provide recruitment tools for targeting users of instrumented applications, and are also flexible enough to yield a representative sample. In some such examples, a master frame of devices with one or more instrumented application(s) installed is created. From the master frame, a probability panel is created and systematically broken into a number of test cells. As used herein, a master frame is defined as a list of users and/or devices that have used and/or executed at least one instrumented application. In examples disclosed herein, the master frame includes ten thousand users and/or devices. However, any number of users and/or devices may be included in the master frame. As used herein, a probability panel is defined to be a subset of the master frame. The probability panel corresponds to users and/or devices who have been selected to be recruited to become panelists. In examples disclosed herein, the probability panel includes four thousand and two hundred users and/or devices. However, any number of users and/or devices may be included in the probability panel.

The probability panel is broken down into a plurality of test cells. In some examples disclosed herein, there are six test cells, each including seven hundred users and/or devices. However, there may be any number of test cells including any number of users and/or devices. In some examples, each of the test cells is assigned a different recruitment procedure and/or recruitment interface. For example, a first user in a first test cell may be presented with a first prompt while a second user in a second test cell may be presented with a second prompt different from the first prompt. The different prompts may request different levels of detailed panelist information (e.g., demographic information, educational information, financial information, etc.). Ultimately, different test cells may result in different success levels of the recruitment procedure. For example, a first prompt associated with a first test cell may request very detailed financial information, while a second prompt associated with a second test cell may not request any financial information. The first prompt may result in fewer users who complete the registration process than the second prompt because, for example, users may be opposed to providing detailed financial information. Using multiple test cells enables identification of how much detail should be requested from potential panelists during a registration process.

Recruitment within the probability panel is implemented using an interface (e.g., a pop-up) generated by the instrumented application. The interface directs interested users to a registration interface (e.g., a website), which collects information that can be used for extrapolating the panel of users to a larger viewing audience. In some examples, demographic information collection is attempted even for users who have not been selected to become panelists. Such collection may facilitate extrapolation of monitoring information collected in association with panelists to a larger population. The monitoring components, recruiting interface, and registration interface interact in a multi-phased process. For example, the monitoring components are not enabled until after the registration interface has been completed.

Example recruitment systems disclosed herein yield a panel large enough to not only measure new behavior (watching Television and/or streaming video on tablets), but also to enable identification of attributes of a population, incentive preferences of a population, etc. As disclosed herein, by reaching users directly in the environment where their behavior will be measured (e.g., via an instrumented application), the versatility of mobile technology in enabling cross-platform research (e.g., television programs watched on tablets via streaming technology) and in efficiently reaching and measuring previously unidentified populations is leveraged to improve audience measurements.

In examples disclosed herein, a monitoring entity (e.g., a neutral third party not involved in media delivery such as The Nielsen Company, Inc.) cooperates with providers of media apps to obtain permission to install and/or otherwise incorporate monitoring components into an application (e.g., an instrumented application) prior to placement in the app store (e.g., Apple iTunes, Google Play, etc.). The first time a metered app is downloaded and launched by the media device, the metering components contact a central facility (e.g., a server operated by the monitoring entity); and the media device (e.g., an iPad®) is assigned a unique identifier (ID) that, in some examples, remains fixed for the life of the media device. In some examples, the unique identifier may be reset and/or removed from the media device. For example, the unique identifier may be removed from the collection facility if the instrumented application has not been used in more than a threshold period of time (e.g., one year, six months, etc.). In the illustrated example, the unique identifier is a serial number that is stored in a shared memory (e.g., a pasteboard, a cache, a registry, etc.) of the media device. However, the unique identifier may be formatted and/or stored in any other manner. For example, the unique identifier may be text data (e.g., a string of characters), binary data, etc. Unlike an ID that might be assigned by the manufacturer, this unique identifier may be assigned regardless of manufacturer or operating system version, and cannot be changed by the user. In some examples, the unique identifier may be removed from the device by, for example, a factory reset. The monitoring components also capture some limited, non-personally identifiable information such as device type (iPad®, iPhone®, etc.), operating system (e.g., iOS, android, etc.) version, the instrumented application name, version of the instrumented application, the initial launch date, etc. Lastly, the monitoring components execute an instruction directing it to contact the central facility on the first launch of the instrumented application after a number of days have passed. However, the instruction may be based on any other duration and/or condition. For example, the monitoring components may be instructed to contact the central facility after the instrumented application has been launched three or more times, etc. With each occurrence of an instrumented application being launched for the first time on a device, the instrumented application name and version is captured and transmitted to the central facility.

Example monitoring components disclosed herein enable the monitoring entity to assemble a master frame including all media devices that have launched at least one instrumented application, and to understand which instrumented application(s) are on each media device. In some examples, in order to meet privacy requirements, the instrumented application, when installed, provides a notice indicating that the monitoring components are present in the instrumented application. This notice is present in the instrumented application's Terms of Service (or End User License Agreement (EULA)), in the App Store (in the description associated with the individual app, including a link to a Frequently Asked Questions website describing the monitoring components and their activities), and/or in the Device settings or App settings.

FIG. 1 is a block diagram of an example environment of use 100 including a central facility and instrumented application constructed in accordance with the teachings of this disclosure to facilitate creation of a panel of media device users. The example environment of use 100 of FIG. 1 includes a media device 130 and a central facility 170. The media device 130 of the illustrated example includes an instrumented application 135, and a data store 150. The example central facility 170 of the illustrated example of FIG. 1 includes an HTTP interface 175, a registration data controller 177, a data store 176, a monitoring data receiver 179, a panel creator 182, a unique ID generator 186, a software development kit (SDK) provider 188, and a reporter 190. The instrumented application 135 of the illustrated example communicates via a network 120 to retrieve media from a media provider 110. Further, the application 135 of the illustrated example is instrumented with monitoring instructions. The monitoring instructions are selectively activated depending on, for example, whether the user is a panelist, whether the user has consented to being monitored, etc. In some examples, when the monitoring instructions are enabled, the application 135 transmits monitoring information to the example central facility 170.

The example media provider 110 of the illustrated example of FIG. 1 includes one or more servers providing Internet media (e.g., web pages, audio, video, images, etc.). The example media provider 110 of FIG. 1 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio services such as Netflix®, YouTube®, Hulu®, Pandora®, Last.fm®, etc.), a web page, and/or any other provider of media. Additionally or alternatively, the example media provider 110 may not be an Internet provider. For example, the media providers may be on a private, a virtual private, and/or semi-private network (e.g., a LAN). Example media providers frequently provide applications that are specific to media that is presented in association with that media provider. For example, a media provider such as Netflix® may provide a Netflix® application to be used on the media device 130. In the illustrated example, the media provider 110 provides media to an application executed by a media device such as the media device 130. In examples disclosed herein, the media provider 110 and/or an application developer instruments the media application with monitoring instructions provided as part of an SDK from the central facility 170 of the monitoring entity.

The example app store 112 of the illustrated example of FIG. 1 is the Apple iTunes app store. In the illustrated example, the app store 112 provides applications (e.g., apps) to users for use on the media device (e.g., an iPad®). While in the illustrated example, the example app store 112 is the Apple iTunes app store, any other app store and/or repository of applications/apps may additionally or alternatively be used such as, for example, Google Play, the Windows Phone app store, the Ubuntu Software Center, etc.

The example network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example network 120 of FIG. 1.

The example media device 130 of the illustrated example shown in FIG. 1 is a device that retrieves media from the media provider 110. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a tablet such as an Apple iPad®, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

The instrumented application 135 of the illustrated example of FIG. 1 is software downloadable via the Internet. As such, it is implemented as computer-readable instructions executing on a hardware logic circuit such as a semiconductor based processor of the media device 130. In the illustrated example, the instrumented application 135 is provided by the media provider 110. However, the instrumented application 135 may be provided by any other entity. In some examples, the instrumented application is installed on the media device 130 by the user by downloading the instrumented application 135 from the app store 112 (e.g., Apple iTunes, Google play, etc.). The application 135 (e.g., an app) presents media retrieved from the media provider 110 and/or from any other Internet location. In examples disclosed herein, the instrumented application 135 is implemented to include monitoring functionality provided by the monitoring entity via, for example, a software development kit (SDK). The monitoring functionality, when enabled, transmits monitoring information to the central facility 170.

The example data store 150 of the illustrated example of FIG. 1 may be any device for storing data such as, for example, flash memory, magnetic media, optical media, etc. In the illustrated example, the data store 150 is implemented by random access memory of the media device 130. Furthermore, the data stored in the data store 150 may be in any data format such as, for example, binary data, comma delimited data, tab delimited data, structured query language (SQL) structures, etc. While in the illustrated example the data store 150 is illustrated as a single database, the data store 150 may be implemented by multiple databases, and/or be stored in multiple memory locations of the media device.

In the illustrated example of FIG. 1, a software development kit (SDK) is provided from the central facility 170 of, for example, an audience measurement entity to a media provider (e.g., an application developer) 110. The provision of this SDK may be via an electronic communication 111 over the network 120. The media provider 110 employs the SDK to generate an instrumented app 135. The media provider 110 then posts the instrumented app to the app store 112 as shown by the electronic message 113 of FIG. 1. In some examples, the instrumented app must first be approved by a third party (e.g., Apple) before it is made available in the app store 112.

Once the instrumented app 135 is made available at the app store, members of the general public, some of which are panelists of the audience measurement entity, may download the app to their respective media device(s) 130 via an electronic message 115 as shown in FIG. 1. When executed, the instrumented application 135 contacts 117 the central facility 170 to determine whether the user of the device on which the instrumented application 135 is executing should be asked if they would like to become a panelist. If so, the instrumented application 135 may then display a prompt to the user, ask for demographic information, transmit monitoring information to the central facility 170, etc.

When an instrumented application 135 is executed on a mobile device, the instrumented application 135 accesses a shared memory location on the media device 130 (e.g., to check a state of a flag) to determine whether monitoring functionality of the instrumented application 135 should be enabled. If so, the monitoring functionality of the instrumented application 135 is executed to collect monitoring information and upload the same to the central facility 170 via electronic message(s) 117. If the monitoring functionality of the instrumented application 135 should not be enabled (e.g., the shared memory location contains a flag indicating the user has opted out of monitoring), the monitoring instructions are disabled and the instrumented application 135 is executed without collecting monitoring information and without uploading monitoring information to the central facility 170.

The central facility 170 of the illustrated example is a facility of an audience measurement entity (e.g., the Nielsen Company (US) LLC) and includes an interface to receive reported metering information (e.g., metadata) from the media device 130 via the network 120. The example central facility 170 of the illustrated example of FIG. 1 includes an HTTP interface 175, a registration data controller 177, a data store 176, a monitoring data receiver 179, a timestamper 180, a panel creator 182, an application ID assignor 184, a unique ID generator 186, a software development kit (SDK) provider 188, and a reporter 190.

In the illustrated example, the central facility 170 includes an HTTP interface 175 to receive HTTP requests that include media monitoring information, demographic information, etc. The HTTP requests are sent with the media monitoring information in their payload. The media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a unique identifier, a user identifier, a panelist identifier, a username, etc.), etc. The requests may not be intended to actually retrieve media, but are instead used as a vehicle to convey the metering information. Thus, the HTTP requests may be referred to as "dummy requests". The central facility 170 is provided with software (e.g., a daemon) to extract the metering information from the payload of the dummy request(s). Additionally or alternatively, any other method(s) to transfer the metering information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc.

The example data store 176 of the illustrated example of FIG. 1 may be any device for storing data such as, for example, flash memory, magnetic media, optical media, etc. The data store 176 of the illustrated example of FIG. 1 stores monitoring information received at the registration data controller (e.g., demographic information transmitted by the instrumented application 135), and/or received at the monitoring data receiver 179 (e.g., media-identifying information, application usage information, etc.). However, the data store 176 may additionally or alternatively store any other information. Furthermore, the data stored in the data store 176 may be in any data format such as, for example, binary data, comma delimited data, tab delimited data, structured query language (SQL) structures, etc. While in the illustrated example the data store 176 is illustrated as a single database, the data store 176 may be implemented by multiple databases, and/or be stored in multiple memory locations of the media device.

The example registration data controller 177 of the illustrated example of FIG. 1 is implemented by a logic circuit such as a semiconductor based processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The example registration data controller 177 receives demographic information from the instrumented application 135 in association with a unique identifier. As described below, the unique identifier is created by the unique ID generator 186. The received registration/demographic information is stored in the data store 176 in association with the unique ID. The received demographic information may later be used to correlate media exposure and/or application usage to a particular panelist and/or demographic.

The example monitoring data receiver 179 of the illustrated example of FIG. 1 is implemented by a logic circuit such as a semiconductor based processor executing instructions, but it could additionally or alternatively be implemented by an ASIC, a PLD, an FPLD, an analog circuit, and/or other circuitry. The example monitoring data receiver 179 receives media monitoring information from the instrumented application 135. As disclosed herein, media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a unique identifier, a panelist identifier, a username, etc.), etc. The monitoring data receiver 179 stores the received monitoring information in the data store 176 in association with a unique ID.

In the illustrated example, the example monitoring data receiver 179 stores and analyzes the monitoring information received from the instrumented application(s) 135 from different media devices. For example, the example monitoring data receiver 179 may sort and/or group metering information by media provider 110 (e.g., by grouping all metering data associated with a particular media provider 110, and/or associated with a particular instrumented application 135). Any other processing of media monitoring information may additionally or alternatively be performed. In some examples, the monitoring data receiver 179 adds a timestamp to the media monitoring information upon receipt. Timestamping (e.g., recording a time and/or a date that an event occurred) enables accurate identification and/or correlation of media that was presented and/or the time that it was presented with the demographics of the user(s) of the media device(s).

The example panel creator 182 of the illustrated example of FIG. 1 is implemented by a logic circuit such as a semiconductor based processor executing instructions, but it could additionally or alternatively be implemented by an ASIC, a PLD, an FPLD, an analog circuit, and/or other circuitry. The example panel creator 182 identifies the master frame and statistically selects users and/or devices within the master frame to be recruited to become panelists. The users and/or devices selected to be recruited are referred to as a probability panel. In some examples, the example panel creator 182 separates the probability panel into a plurality of test cells. Each test cell may be associated with different recruitment information (e.g., different prompts, different demographic information requested, etc.).

The example unique ID generator 186 of the illustrated example of FIG. 1 is implemented by a logic circuit such as a semiconductor based processor executing instructions, but it could additionally or alternatively be implemented by an ASIC, a PLD, an FPLD, an analog circuit, and/or other circuitry. The example unique ID generator 186 generates a unique identifier in response to a request for a unique identifier from an instrumented application 135. In the illustrated example, the unique identifier is a serial number that is uniquely assigned to each user and/or media device 130. However, any other way of generating a unique identifier may additionally or alternatively be used such as, for example, a username, an email address, a hardware identifier of the media device 130, etc.

The example SDK provider 188 of the illustrated example of FIG. 1 is implemented by a logic circuit such as a semiconductor based processor executing instructions, but it could additionally or alternatively be implemented by an ASIC, a PLD, an FPLD, an analog circuit, and/or other circuitry. The example SDK provider 188 provides instructions to application developers to facilitate creation of the instrumented application 135. In some examples, the SDK is provided such that the application developer(s) can integrate the SDK into existing applications. While in the illustrated example an SDK is provided, the monitoring components instrumented by the SDK and/or monitoring instructions provided via the SDK may be provided in any other fashion. For example, the monitoring components may be provided as an application programming interface (API), a plugin, an add-on, etc. In some examples, the example SDK provider 188 provides the application developer with an application identifier that is unique to the application that will be instrumented. Unique application identifiers enable accurate correlation of instrumented applications and the users and/or devices on which such instrumented applications are executed. Moreover, unique application identifiers enable the panel creator 182 to select users and/or devices based on applications with which they are associated.

The example reporter 190 of the illustrated example of FIG. 1 is implemented by a logic circuit such as a semiconductor based processor executing instructions, but it could additionally or alternatively be implemented by an ASIC, a PLD, an FPLD, an analog circuit, and/or other circuitry. The example reporter 190 generates reports indicative of media exposure metrics and/or application usage metrics based on one or more different types of client devices (e.g., personal computers, portable devices, mobile phones, tablets, etc.). For example, the reporter 190 compiles media exposure metrics based on the correlation of the media-identifying information, the application usage information, and the user-identifying information. A report is then generated to indicate media exposure and/or application usage statistics. In some examples, the exposure measurements provide ratings information for different media (e.g., a particular television show, a particular website, a particular movie, etc.) In some examples, the exposure measurements indicate ratings information and/or usage statistics for different instrumented applications. In some examples, the reporter 190 reports metrics about user acceptance of registration prompts across various test cells.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different applications and/or types of applications that accessed the same media. For example, a first percentage of an audience may be exposed to news media via a browser application, while a second percentage of the audience may be exposed to the same news media via a news reader application.

Although for simplicity, the above discussion focuses on a single media device 130, a single instrumented app 135, a single media provider 110, a single app store 112, and a single central facility 170, any number of any of these components may be present. For example, in a typical implementation, it is expected that multiple media providers will offer multiple different instrumented apps to the public at large. Thus, it is expected that there will be many media devices accessing such apps, and that a significant portion of the users will agree to be recruited and/or eventually become panelists. Thus, it is expected that there will be many instances of the above processes conducted across many devices at overlapping and/or distinct times. Thus, for example, there may be many instantiations of the machine-readable instructions disclosed in the below flowcharts operating at the same or different time. Some of these instances may be implemented as parallel threads operating on a same device.

Figure 2:
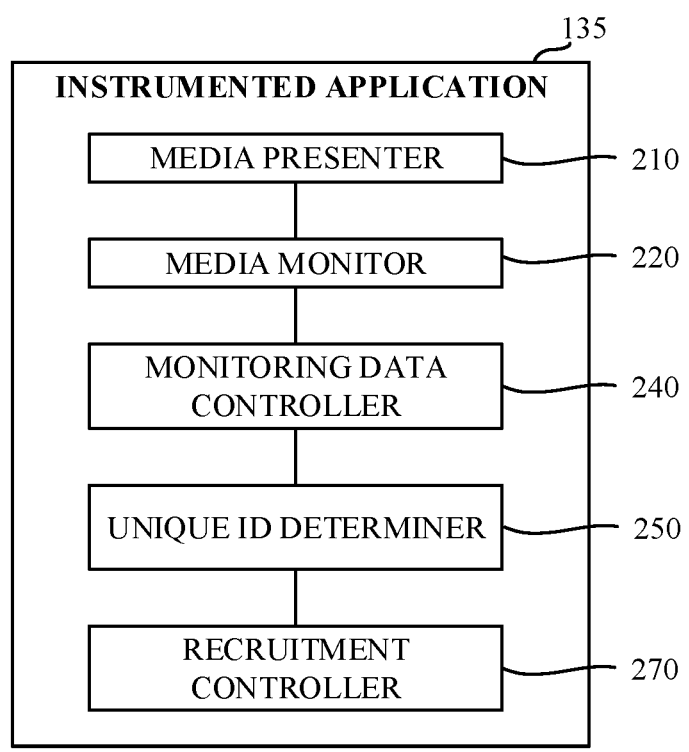
FIG. 2 is a block diagram of an example implementation of the example instrumented application of FIG. 1.

FIG. 2 is a block diagram of an example implementation of the example instrumented application 135 of FIG. 1. The example instrumented application 135 of FIG. 2 includes a media presenter 210, a media monitor 220, a monitoring data controller 240, a unique ID determiner 250, and a recruitment controller 270.

The example media presenter 210 of FIG. 2 is implemented by computer executable instructions. In the illustrated example, the media presenter 210 interacts with a QuickTime® application programming interface (API) to display media via the media device 130. While in the illustrated example, the QuickTime® API is used, any other media presenting framework may additionally or alternatively be employed. For example, the media presenter 210 of the illustrated example may interact with an Adobe® Flash® media presentation framework.

The example media monitor 220 of the illustrated example of FIG. 2 is implemented by computer executable instructions. The media monitor 220 of FIG. 2 is downloaded with the instrumented app 135 and is initiated when the instrumented application 135 determines that the monitoring functionality should be enabled. The media monitor 220 of the illustrated example extracts metering data (e.g., signatures, watermarks, etc.) from the media presented by the media presenter 210. For example, the media monitor 220 can implement functionality provided by a software development kit (SDK) to extract one or more audio watermarks, one or more video (e.g., image) watermarks, etc., embedded in the audio and/or video of the media presented by the media presenter 210. (For example, the media may include pulse code modulation (PCM) audio data or other types of audio data, uncompressed video/image data, etc.)

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the code/watermark is transmitted with and/or in association with the media as media-identifying metadata. The media-identifying metadata may be formatted in a text or binary format such as, for example, an ID3 tag. In some examples, the media-identifying metadata includes the data from the code/watermark, etc. However, in some other examples, the media-identifying metadata is derived from and/or representative of the code/watermark, and/or a signature, etc. Example methods and apparatus to transcode watermarks into ID3 tags are disclosed in U.S. patent application Ser. No. 13/341,646, U.S. patent application Ser. No. 13/341,661, U.S. patent application Ser. No. 13/443,596, U.S. patent application Ser. No. 13/455,961, U.S. patent application Ser. No. 13/472,170, U.S. patent application Ser. No. 13/793,991, U.S. patent application Ser. No. 13/793,974, and U.S. patent application Ser. No. 13/793,983, which are hereby incorporated by reference in their entireties.

In the illustrated example of FIG. 2, the example media monitor 220 determines (e.g., extracts, transforms, derives, decodes, converts, etc.) the media-identifying metadata (e.g., such as media identifying information, source identifying information, watermarks, codes, etc.) associated with, and/or transmitted with the media (e.g., in an ID3 tag, in a Hypertext Transfer Protocol (HTTP) Live Streaming (HLS) manifest, in an Moving Pictures Experts Group version 2 (MPEG2) transport stream, in a timed text track, in an encryption key associated with the media, etc.). The media-identifying metadata may be a code in, for example, a text or binary format located in an ID3 tag associated with the media. In some examples, the media monitor 220 converts the metering data into a text and/or binary format for transmission to the central facility 170.

In some examples, the media monitor 220 monitors events other than media presentation events. For example, the media monitor 220 may monitor application interaction events such as, for example, when a link in an application is selected, when an application is launched, when an application is closed, etc.

The example monitoring data controller 240 of the illustrated example of FIG. 2 is implemented by computer executable instructions. In the illustrated example, the monitoring data controller 240 manages records stored in the data store 150. For example, the data controller 240 controls transmission of stored records, deletion of aged records, determining if a storage threshold of the data store 150 is exceeded, etc.

The example unique ID determiner 250 of the illustrated example of FIG. 2 is implemented by computer executable instructions. In the illustrated example, the unique ID determiner 250 determines whether a unique identifier is present on (e.g., stored on a shared memory of) the media device 130. The unique identifier may be present on the media device 130 by virtue of another instrumented application having been installed and/or the unique ID determiner previously having determined and stored the unique identifier. In the illustrated example, when the unique identifier is not present on the media device 130, the unique ID determiner 250 requests the unique identifier from the central facility 170. However, in some examples, the unique ID determiner 250 may determine the unique identifier without contacting the central facility 170. In such examples, the unique identifier may be based on, for example, a username, a hardware address of the media device (e.g., a media access control (MAC) address, an electronic serial number (ESN), etc.), etc.

The example recruitment controller 270 of the illustrated example of FIG. 2 is implemented by computer executable instructions. In the illustrated example, the recruitment controller 270 controls whether a recruitment interface (e.g., the example recruitment interface 310 of FIG. 3) is displayed to the user. In some examples, the recruitment controller 270 displays a demographic information collection interface (e.g., the example demographic information collection interface 410 of FIG. 4). When displaying the demographic information collection interface, the example recruitment controller 270 collects demographic information from the user and transmits the collected information to the central facility 170.

Figure 3:
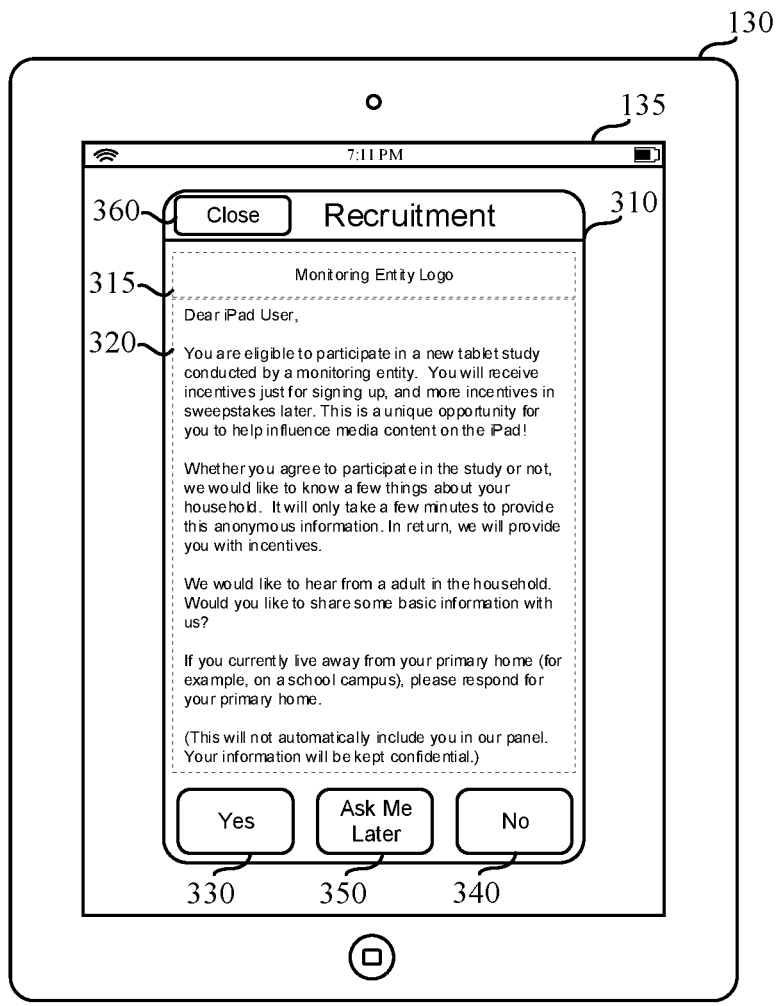
FIG. 3 is an example recruitment interface that may be displayed by the instrumented application of FIGS. 1 and/or 2.

FIG. 3 is an example recruitment interface 310 that may be displayed by the instrumented application 135 of FIGS. 1 and/or 2. As described above, different recruitment interfaces, when presented, may result in different levels of user participation. In examples disclosed herein, appropriate recruitment practices in selecting the verbiage, formulating the questions, and designing the interface for each message to respondents are used when designing the recruitment interface 310. However, since recruitment via an instrumented application 135 is different from prior methodologies (e.g., web-page based recruitment, telephone based recruitment, advertisement based recruitment, etc.), new considerations are taken into account such as, for example, how a recruitment interface is presented, when a recruitment interface is presented, etc. Examples disclosed herein focus on these considerations, to provide a multi-stage, cross-platform environment, yet seamless recruitment flow that captures an accurate panel of potential tablet instrumented application users in the home, while giving users the information and flexibility to participate in the study to the extent that they desire.

In the illustrated example of FIG. 3, the example recruitment interface 310 includes a logo 315, a prompt 320, a "yes" button 330, a "no" button 340, an "ask me later" button 350, and a close button 360.

In examples disclosed herein, many different methodologies may be employed when designing the recruitment interface 310. To ensure that sampled users excludes trial users (e.g., users who are using an instrumented application in a trial mode, users who have only recently installed the application and have not yet established a pattern of usage, etc.), and to avoid the possibility of introducing confusion on the first or second launch of the instrumented application 135, the instrumented application 135 displays the recruitment screen 310 at the third launch of the instrumented application 135. However, in some examples, the instrumented application 135 may display the recruitment screen 310 at a different time based on other criteria such as, for example, upon a fifth launch of the instrumented application 135, one week after the instrumented application 135 was first installed, etc.

It is important to keep in mind some of the reasons why recruitment starts from the instrumented application to ensure that the users sampled are actually exposed to media via the instrumented application. When contacted for recruitment, users could actually be watching media—an activity where interruptions are unwelcome. Thus, in examples disclosed herein, the timing of the display of the recruitment interface 310 is implemented so that it does not coincide with any video streaming. Specifically, in some examples the recruitment interface 310 (e.g., a pop-up) displays only after the video ends or is stopped (e.g., while the user is searching for another episode to watch or for more information about the program).

Users have developed resistance (and even animosity) to mobile ads, which appear in apps and websites and often diminish user experience and hinder the attainment of the goal that led the user to that app or website (e.g., entertainment, escape, search for specific information). In some examples, because of operating system (e.g., iOS) limitations, the recruitment interface 310 does not include any special fonts that would immediately draw the users' attention (e.g., highlighting, italics, etc.). Lastly, in examples disclosed herein, users are not taken out of the instrumented application 135 environment for the recruitment process. Rather, communication with the users takes place within the instrumented application 135 they were initially using, so as not to affect their behavior and/or affect their use of the instrumented application 135.

The example recruitment interface 310 includes the example logo 315. In the illustrated example, the logo 315 represents the monitoring entity and, thereby, informs the user that the recruitment interface 310 is associated with the monitoring entity. Including the logo 315 of the monitoring entity lends research legitimacy to the inquiry. In the illustrated example, the logo 315 is displayed at the top of the recruitment interface 310. However, the example logo 315 may be displayed in any location.

The example recruitment interface 310 includes an example prompt 320. The example prompt 320 includes text that, in some examples, informs the user that the recruitment is taking place. In the illustrated example, the prompt 320 is enlarged to fill the size of the recruitment interface. Moreover, all of the text of the example prompt 320 is displayed at once, resulting in an interface that does not require the user to scroll through the text to read the entire prompt 320. As described above, different text may be used in the prompt 320 based on which test cell the user has been assigned. Using different text within the prompt 320 enables the monitoring entity to test different wordings, formats, etc. in an effort to create the most effective recruitment interface.

Although the recruitment interface 310 appears in a plain text pop-up within the instrumented application 135, the recruitment interface is structured to not look like an advertisement or a legal disclaimer (common pop-ups that users have learned to ignore or avoid). In some examples, the users may be provided with a snapshot of the research, to enable the user to understand the purpose and/or results of the monitoring effort by glancing at the screen for a few seconds (e.g., the time it would take someone to close a pop-up). Keeping the structure in line with other alerts common on the operating system (e.g., Apple iOS, Google Android, etc.), with which users are familiar, facilitates seamlessness of the transition between the operating system environment and the recruitment environment.

Media devices, such as tablets, smartphones, etc. are often shared among several household members, who may have different reactions to the study and/or different reasons for accepting or declining the recruitment invitation. To give undecided or additional household members the time necessary to make a decision, the recruitment interface offers the option to defer recruitment ("Ask Me Later") via the "ask me later" button 350. If the "ask me later" button 350 is selected, the recruitment invitation appears again at the next launch of the instrumented application 135. In the illustrated example, users can defer a maximum of two times. However, any other deferment limit may be used (e.g., five times, ten times, etc.), or a maximum number of deferments may not be used. If the deferral option has been chosen a number of times greater than or equal to the deferment limit, the "ask me later" button 350 is not displayed as part of the recruitment interface 310. After the maximum deferment limit is reached, it is likely that the user would already have made a decision about participating in the study. Instead, users may accept the recruitment interface by selecting the "yes" button 330, or may decline the recruitment interface by selecting the "no" button 340. In some examples, the recruitment interface 310 includes a close button 360. The close button 360 may be included so that the recruitment interface 310 stylistically appears in line with other alerts common on the operating system. In the illustrated example, the close button 360 has the same functionality as the "ask me later" button 350. While in the illustrated example, the "yes" button 330, the "no" button 340, the "ask me later" button 350, and the close button 360 are described as buttons, any other type of interface element may additionally or alternatively be used such as, for example, a drop down menu, radio selection buttons, checkboxes, etc.

A concern (both from a cooperation perspective and a legal perspective) is the high likelihood that a child will be using the media device at the time the recruitment interface is displayed. Depending on reading and comprehension skills, children could willingly or unwillingly accept or reject recruitment. On one hand, if the child accepts, the monitoring entity cannot use monitoring data received from that media device, per the Children's Online Privacy Protection Act (COPPA). An adult's consent is needed at the registration stage for the monitoring entity to keep data from minors. On the other hand, if a child rejects recruitment (e.g., because he/she has not yet learned to read), the monitoring entity risks losing much valuable monitoring data (e.g., data associated with an adult user).

Several measures are taken to ensure that minors' recruitment accounts for both sample-building goals and legal provisions. At the initial recruitment stage, if children defer recruitment (e.g., by selecting the "ask me later" button 350), the invitation appears again, allowing for the opportunity of an adult to receive and/or review it. If the user rejects (e.g., by selecting the "no" button 340), a confirmation window appears to ensure that the "no" button has not been selected at random or by mistake. In some examples, the user may be thanked for their time and informed that such information will or will not be requested from them at a later time. If the user accepts (e.g., by selecting the "yes" button 330), they will need to indicate that they are an adult (e.g., by entering their birthdate, etc.) before providing any detailed demographic information. In some examples, the user may be thanked for selecting the "yes" button 330.

Figure 4:
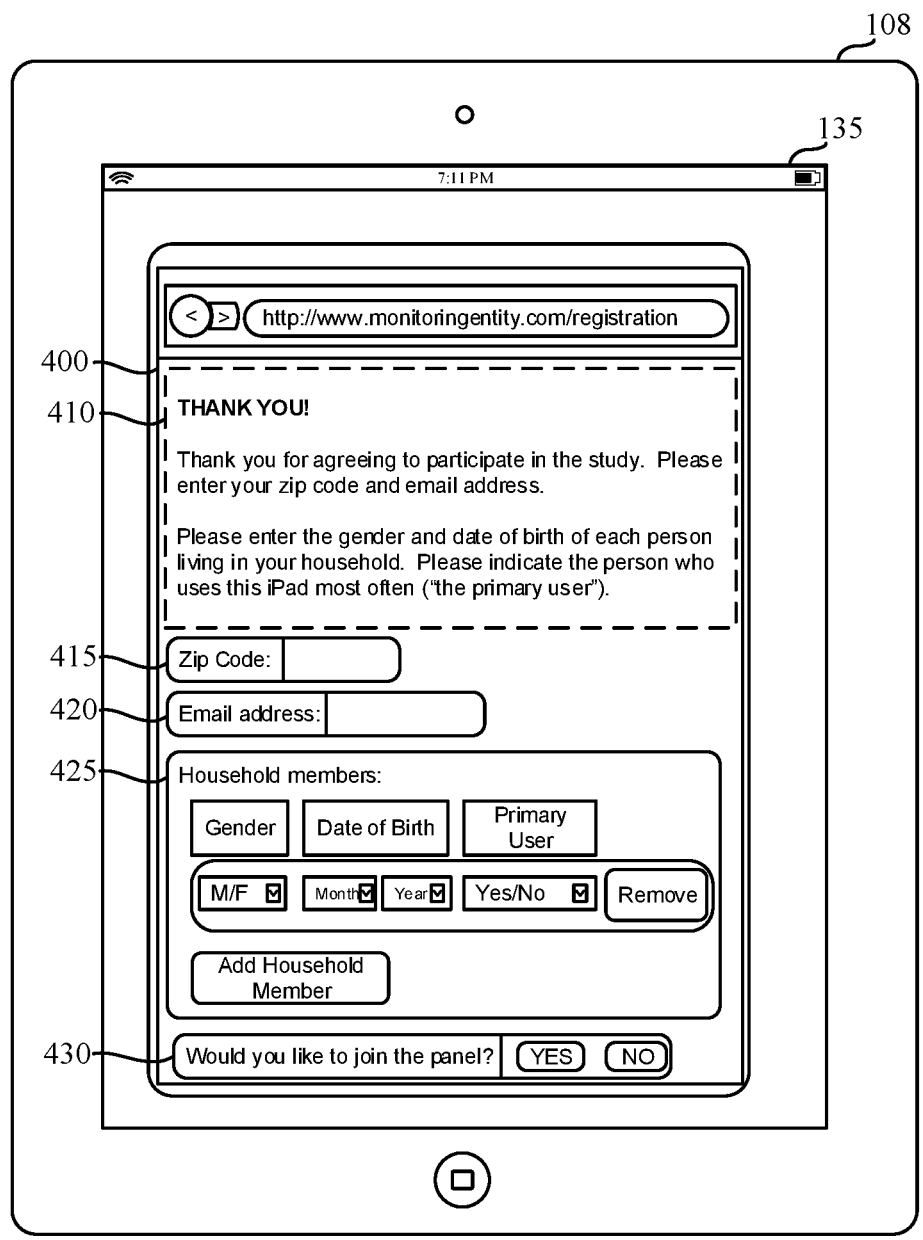
FIG. 4 is an example demographic information collection interface.

FIG. 4 is an example demographic information collection interface 400. Once a user has agreed to become part of the panel, demographic information of the user is collected. Demographic data from these users are valuable for enumeration purposes, even if some users do not register for long-term measurement. Just because the user has expressed interest in the study, does not necessarily mean that they are part of the panel. As noted above, the recruitment interface indicates that showing interest in the study by selecting "Yes" does not automatically include one in the panel. Once a user declares that they would like to learn more about the study, they are taken to the example demographic information collection interface 400 (e.g., a website) where they are asked to provide some basic demographic information about their household. This demographic information collection interface 400 is customized for use on a media device (e.g., a tablet having a touch-screen interface) and is designed similarly to the recruitment interface 310, to ensure a seamless transition.

In the illustrated example, the demographic information collection interface 400 asks for a few basic pieces of demographic information about the respondent (e.g., a zip code 415, an email address 420) and about each household member 425 (month/year of birth, gender, etc.). The user is also asked to identify himself/herself among these household members, in order to assess whether he/she is eighteen years or older (e.g., based on the birth date provided). Respondents under the age of eighteen are automatically disqualified and cannot proceed with recruitment. In such an example, disqualification acts as a deferral, with the initial recruitment invitation reappearing at the next app launch to allow for an adult to respond.

Once in the web environment of the demographic information interface, transitioning from one screen to the next is smooth, quick, and logical. After providing the basic demographic information used for enumeration on the first screen, respondents can choose to join the research panel or not 430. If they refuse to join, they are directed to a screen confirming rejection (just as with the initial recruitment invitation of the recruitment interface). This screen provides an opportunity to return to recruitment, in case the rejection was accidental. If users agree to join the panel, they must first pass two eligibility screens (besides the age requirement): they must not be a media employee (e.g., an employee of the monitoring entity, an employee of a media distributor, an employee of a television network, etc.), and they must not participate in any other panels operated by the monitoring entity (to avoid cross-panel cannibalization and to screen out respondents with a vested interest in the study results). If respondents do not fall in either of these categories, they are included in the panel and receive a confirmation email at the address they provided on the first website screen.

Since an example goal of such studies is to estimate the universe of tablet instrumented application users, it is necessary to collect data required for measuring and weighting the demographic categories within this universe. However, given the lack of data on the level of cooperation and response rates expected from within-app recruitment, some respondents may be willing to provide more information than what is requested. To test the extent to which respondents are willing to share personal information in this context, a subset of respondents (e.g., one or more test cells) are randomly selected to provide additional information to be used for weighting. This data may include education, race, income, and ethnicity, and is required in an additional (and final) screen between the eligibility screen and the panel membership confirmation screen. The subset of randomly selected users and/or devices within the probability panel is referred to as a test cell.

In the illustrated example, the demographic information collection interface includes a message 410. The example message 410 of the illustrated example of FIG. 4 thanks the user for agreeing to participate in the study. However, any other message 410 may be used. In the illustrated example, the example message 410 used is based on the test cell to which the user and/or device has been assigned. In some examples, the message 410 offers an incentive for providing demographic information and/or participating in the study. Different levels of incentives may be offered for participation in different test cells. For example, users selected to provide very detailed demographic information may be given more incentives than users selected to provide basic demographic information.

In examples disclosed herein, six test cells are used. However, any number of test cells may additionally or alternatively be used. These cells combine various incentive amounts given for providing the initial enumeration data and for joining the panel, delivered as either an electronic gift card or as a monthly sweepstakes. In examples disclosed herein, to ascertain a statistically observable difference among test cells, seven hundred users are assigned to each of six test cells, for a total sample size (e.g., the probability panel) of four thousand and two hundred. Response rates associated with each of the test cells may then be used to determine which questions are asked of respondents and/or what types of incentives are offered to respondents.

In examples disclosed herein, the involvement of the monitoring entity is disclosed at all times. In some examples, a reference to the study and/or monitoring efforts appear on the device in a place that is both visible and non-intrusive when users watch video. Accordingly, the instrumented application 135 includes an icon associated with the monitoring entity embedded discreetly (yet visibly) in the video-viewing apps. This icon also serves as the go-to place for users to learn more about the study and to opt out if they wish (links to the study info and opt-out pages are also provided in the confirmation emails delivered after joining the panel).

FIG. 5 illustrates an example table 500 representative of unique identifiers stored in association with application identifiers. In the illustrated example of FIG. 5, the example table 500 includes a unique identifier column 510, an application identifier column 520, and a timestamp column 530. The example unique identifier 510 stores unique identifiers created by the unique ID generator 186 of the central facility 170. In the illustrated example, the unique identifiers are created by the unique ID generator 186. However, the unique IDs may be created and/or assigned in any other fashion. For example, unique identifiers may be created by the user, the unique identifier may be a hardware address of the media device 130, etc.

The application identifier column 520 stores an application identifier. In the illustrated example, the application identifier is specific to the instrumented application 135. In the illustrated example, the application identifier is a name of the application such as, for example, "ESPN", "HBO Go", "Hulu", etc. In some examples, the application identifier includes version information of the instrumented application 135 such as, for example, "version 1.1.0", etc. In some examples, the application identifier is a serial number associated with the instrumented application. In the illustrated example, the application identifier is assigned by the media provider 110 and/or the application developer of the instrumented application 135. However, in some examples, the SDK provider 188 of the central facility 170, when providing the SDK to the media provider 110, may assign an application identifier to be used with the instrumented application 135.

The timestamp column 530 represents a time when the instrumented application 135 reported that the user and/or device identified in the unique identifier column 510 first launched the application identified in the application identifier column 520. In the illustrated example, only one row is stored per user/device and application pair. Such row is associated with the first launch of the instrumented application 135. However, the timestamp column may be updated to reflect the most recent launch of the instrumented application 135, multiple rows may be recorded for each user/device and application pair representing each time that the instrumented application 135 was launched, etc.

The example table 500 of the illustrated example of FIG. 5 includes a first row 550, a second row 560, and a third row 570. However, any number of rows may additionally or alternatively be included in the example table 500. The first example row 550 identifies that a first user and/or device launched an ESPN application at a first-time. The second example row 560 identifies that the first user and/or device then launched an "HBO Go" application at a second time. The third example row 570 identifies that a second user and/or device launched a "Hulu" application at a third time. While in the illustrated example, two users are represented executing three applications, any other number of users and/or applications may additionally or alternatively be used.

FIG. 6 illustrates an example table 600 representative of recruitment information stored in association with a unique identifier. In the illustrated example of FIG. 6, the example table 600 includes the unique identifier column 510, a recruitment offer presented column 620, a recruitment offer accepted column 630, and a demographic information collected column 640. The example recruitment offer presented column 620 represents whether a recruitment offer has been presented to the user via the instrumented application 135. The example recruitment offer accepted column 630 represents whether the user has accepted and/or agreed to participate in the monitoring study. The example demographic information collected column 640 represents whether demographic information has been collected from the user. If, for example, the user has agreed to participate in the study, but not yet provided the demographic information, the user may be contacted to collect such demographic information.

The example table 600 of the illustrated example of FIG. 6 includes a first row 650, a second row 660, a third row 670, and a fourth row 680. The first example row 650 corresponds to the first user and/or device (e.g., the user 001 associated with row 550 and row 560 of FIG. 5). The first example row 650 identifies that the recruitment offer has been presented to the first user, that the first user has accepted the recruitment offer, and that demographic information has been collected from the first user. Once the first user has provided demographic information, monitoring functionality may be enabled for instrumented applications associated with the first user and/or device.

The second example row 660 corresponds to the second user and/or device (e.g., the user "002" associated with row 570 of FIG. 5). The second example row 660 identifies that the recruitment offer has been presented to the second user, but that the second user has refused the recruitment offer. Accordingly, the second example row 660 represents the demographic information associated with the second user and/or device is not applicable, because the second user refused the recruitment offer.

The third example row 670 corresponds to a third user and/or device. The third example row 670 identifies that the third user has not yet been presented with a recruitment offer. This may be because, for example, the instrumented application 135 associated with the third user and/or device has not yet been launched the requisite number of times before the recruitment interface 310 would be presented. Accordingly, information regarding whether the third user and/or device has accepted the recruitment offer or has provided any demographic information is not applicable.

The fourth example row 680 corresponds to a fourth user and/or device. The fourth example row 680 represents that the fourth user and/or device has not been selected to be provided with a recruitment offer. Because users who become panelist are often provided with incentives for their participation in the study, maintaining and operating too large of a panel may become cost prohibitive. As such, not all users may be selected to be recruited. The fourth example user and/or device may be selected for recruitment at a later time.

FIG. 7 illustrates an example table 700 representative of a unique identifier stored in association with a test cell. In the illustrated example of FIG. 7, the example table 700 includes the unique identifier column 510, and a test cell column 720. The example test cell column 720 identifies a test cell to which the user and/or device identified in the unique identifier column 510 has been assigned. In the illustrated example, a first example row 750 indicates that the first user and/or device (e.g., corresponding to row 550 and row 560 of FIG. 5, and row 650 of FIG. 6) has been assigned to a first test cell. A second example row 760 indicates that the second user and/or device (e.g., corresponding to row 570 of FIG. 5 and row 660 of FIG. 6) has been assigned to a second test cell. A third example row 770 indicates that the third user and/or device (e.g., corresponding to row 670 of FIG. 6) has been assigned to the first test cell. A fourth example row 780 indicates that the fourth user and/or device (e.g., corresponding to row 680 of FIG. 6), who was not selected for recruitment, has not been assigned to a test cell.

FIG. 8 illustrates an example table 800 representative of test cell information that may be stored by the central facility of FIG. 1. In the illustrated example of FIG. 8, the example table 800 includes the test cell column 720, a recruitment interface data column 825, a request ethnicity column 830, a request age column 835, and a request financial information column 840. However, any other data associated with a test cell may additionally or alternatively be included such as, for example, an incentive column identifying incentives that are to be offered to users assigned to the test cell, a column indicating whether the monitoring entity logo is to be displayed as part of the recruitment interface 310, etc.

The example recruitment interface data column 825 includes information about the recruitment interface 310 that is presented to the user via the instrumented application 135. In some examples, different recruitment interfaces may result in different levels of user agreement to participate in the study. For example, a recruitment interface that is very detailed about how the study is performed may contain too much text and/or legal disclaimers and discourage users from agreeing to participate in the study. Conversely, a recruitment interface that is not detailed about how the study is performed may have a similar effect of dissuading users from agreeing to participate in study. Using different test cells enables the monitoring entity to understand the effect of different recruitment interfaces on acceptance and/or refusal rates.

The example request ethnicity column 830 identifies whether ethnicity information will be requested as part of the demographic information for users assigned to a particular test cell. The example request age column 835 identifies whether age information will be requested as part of the demographic information for users and/or devices assigned to a particular test cell. In some examples, age information is limited to whether the user is an adult (e.g., over the age of eighteen). However, in some other examples, age information may be more detailed and may, for example, request the user provide their date of birth. The example request financial information column 840 identifies whether financial information will be requested as part of the demographic information for users assigned to the particular test cell. In the illustrated example, the requested financial information may include, for example, a household income per annum associated with the user, a credit score of the user. Understanding financial information such as household income may enable the monitoring entity to better tailor incentives offered to users of different demographic populations.

The example table 800 of the illustrated example of FIG. 8 includes a first example row 850 and a second example row 860. The first example row 850 identifies information associated with a first test cell. The second example row 860 identifies information associated with a second test cell. In the illustrated example, the first test cell uses a first recruitment interface, while the second test cell uses a second recruitment interface different from the first recruitment interface. In the illustrated example, ethnicity information is not requested in association with the first test cell, but is requested in association with the second test cell. In the illustrated example, age information is requested for both the first test cell and the second test cell. In the illustrated example, financial information is not requested for either of the first test cell or the second test cell. However, any combination of demographic data requested for a given test cell may additionally or alternatively be used.

While an example manner of implementing the example central facility 170 and/or the example instrumented application 135 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example HTTP interface 175, the example registration data controller 177, the example monitoring data receiver 179, the example panel creator 182, the example unique ID generator 186, the example SDK provider, the example reporter 190, and/or, more generally, the example central facility of FIG. 1, and/or the example media presenter 210, the example media monitor 220, the example monitoring data controller 230, the example unique ID determiner 250, the example recruitment controller 270, and/or, more generally, the example instrumented application 135 of FIGS. 1 and/or 2 may be implemented by hardware, software, firmware and/or any combination of hardware, software and/or firmware. Thus, for example, any of the example HTTP interface 175, the example registration data controller 177, the example monitoring data receiver 179, the example panel creator 182, the example unique ID generator 186, the example SDK provider, the example reporter 190, and/or, more generally, the example central facility of FIG. 1, and/or the example media presenter 210, the example media monitor 220, the example monitoring data controller 230, the example unique ID determiner 250, the example recruitment controller 270, and/or, more generally, the example instrumented application 135 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HTTP interface 175, the example registration data controller 177, the example monitoring data receiver 179, the example panel creator 182, the example unique ID generator 186, the example SDK provider, the example reporter 190, the example media presenter 210, the example media monitor 220, the example monitoring data controller 230, the example unique ID determiner 250, and/or the example recruitment controller 270 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 170 of FIG. 1 and/or the example instrumented application 135 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Flowcharts representative of example machine readable instructions for implementing the example central facility 170 of FIG. 1 and/or the example instrumented application 135 of FIGS. 1 and/or 2 are shown in FIGS. 9, 10, 11, 12, 13, and/or 14. In this example, the machine readable instructions comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program(s) is/are described with reference to the flowchart(s) illustrated in FIGS. 9, 10, 11, 12, 13, and/or 14, many other methods of implementing the example central facility 170 of FIG. 1 and/or the example instrumented application 135 of FIGS. 1 and/or 2 may alternatively be used. For example, the order of execution of the blocks may be changed, and/or some of the blocks described may be changed, eliminated, or combined.

As mentioned above, the example processes of FIGS. 9, 10, 11, 12, 13, and/or 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 9, 10, 11, 12, 13, and/or 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 9:
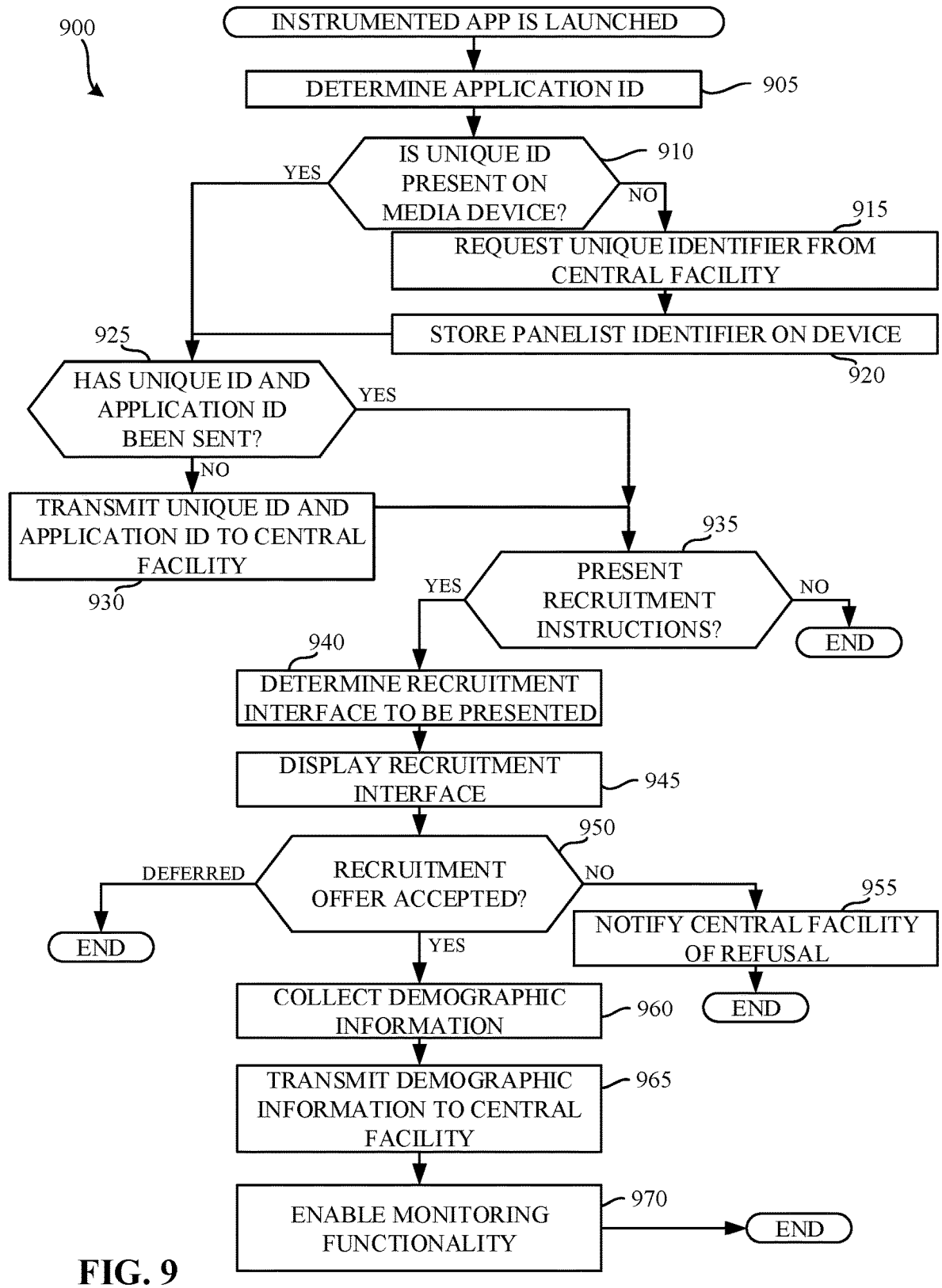
FIG. 9 is a flowchart representative of example machine-readable instructions that may be executed to implement the example instrumented application of FIGS. 1 and/or 2.

FIG. 9 is a flowchart representative of example machine-readable instructions 900 that may be executed to implement a monitoring enabled (e.g., instrumented) app such as the example instrumented application 135 of FIGS. 1 and/or 2. The example program 900 of FIG. 9 begins when the example instrumented application 135 is executed (e.g., launched). The example instrumented application 135 may be executed when, for example, a user selects and/or clicks on an icon associated with the application 135. In some examples, the example program 900 may begin when the example instrumented application 135 is installed. In the illustrated example, the instrumented application 135 is installed via an "app store" (e.g., apple iTunes, Google Play, etc.). However, the example instrumented application 135 may be installed in any other fashion. For example, the example instrumented application 135 may be preinstalled on the media device (e.g., present at the time the media device was purchased). In examples disclosed herein, the instrumented application 135 is to perform a function unrelated to audience measurement (e.g., a game function, a media presentation function, a news presentation function, etc.). The example instrumented application 135 may be any type of app including, for example, a game, a widget, a news reader, a browser, etc.

Once the instrumented application 135 is launched, the monitoring data controller 240 determines an application identifier of the instrumented application 135 (block 905). In the illustrated example, the instrumented application 135 includes an application identifier (e.g., an application name that uniquely identifies the instrumented application 135). In some examples, the application identifier is created by the media provider 110 and/or application developer. However, in some examples the application identifier is provided to the media provider and/or application developer by the SDK provider 188 of the central facility 170 when the SDK is provided.

The unique identifier determiner 250 then determines whether a unique identifier is present on the media device 130 (block 910). The unique identifier is shared among one or more instrumented applications via the data store 150. If the unique identifier is not present on the media device, the unique identifier determiner 250 requests a unique identifier from the central facility 170. The unique identifier generator 186 of the central facility 170 may then respond with the unique identifier. The unique identifier determiner 250 then stores the unique identifier on the media device 130. In some examples, the unique identifier determiner 250 does not request the unique identifier from the central facility 170, but instead, may generate the unique identifier independent of the central facility 170. For example, the unique identifier may be based on a hardware address of the media device, a username, etc.

Once the unique identifier determiner 250 has ensured that there is a unique identifier present on the media device, the monitoring data controller 240 determines whether the unique identifier and application identifier pair has been sent to the central facility 170 (block 925). Transmitting the unique identifier and application identifier pair enables the central facility 170 to create the example table 500 described in connection with FIG. 5. If the unique identifier and the application identifier have not previously been sent, the monitoring data controller 240 transmits the unique identifier and application identifier to the central facility 170 (block 930). In some examples, the monitoring data controller 240 may not determine whether the unique identifier and application identifier have previously been sent and may, instead, transmit the unique identifier and application identifier pair upon every launch of the instrumented application 135.

Once the monitoring data controller 240 has ensured that the central facility 170 is aware of the panelist identifier and application identifier pair, the recruitment controller 270 determines whether recruitment instructions should be presented (block 935). In the illustrated example, the recruitment controller 270 contacts the central facility 170 to determine whether the user and/or device should be recruited. The example registration data controller 177 of the central facility 170 may consult the example table 600 of FIG. 6 to determine whether a recruitment offer should be presented to the user.

If a recruitment offer is not to be presented, control terminates. The instrumented application 135 then goes on to perform a function unrelated to audience measurement (e.g., a game function, a media presentation function, a news presentation function, etc.). In some examples, the recruitment interface is not presented until the application has been launched a threshold number of times. For example, the recruitment interface may be presented upon the third launch of the instrumented application 135. If recruitment instructions are to be presented (block 935), the recruitment controller 270 determines the recruitment interface to be presented (block 940). In the illustrated example, the example recruitment controller 270 determines the recruitment interface to be presented by consulting the registration data controller 177 of the example central facility 170. For example, the recruitment interface data column 825 of FIG. 8 may be queried by the registration data controller 177 and/or the recruitment controller 270 to determine the recruitment interface data to be used when presenting the recruitment interface (e.g., the example recruitment interface 310 of FIG. 3). The recruitment controller 270 then displays the recruitment interface to the user (block 945). The recruitment controller 270 then determines whether the user has accepted the recruitment offer presented in the recruitment interface (block 950).

If the user has refused the offer presented in the recruiting interface (e.g., by clicking the "no" button), the recruitment controller 270 notifies the central facility of the refusal of the recruitment interface (block 955). Control then terminates. Similarly, if the user has deferred acceptance of the offer presented in the recruitment interface, control terminates. If, however, the user has accepted the offer presented in the recruitment interface, the recruitment controller 270 proceeds to collect demographic information associated with the user (block 960). In the illustrated example, the recruitment controller 270 consults the registration data controller 177 to determine what information should be requested from the user. Once the demographic information is collected, the recruitment controller 270 transmits the demographic information to the example registration data controller 177 of the central facility 170. The user is then considered a panelist, and monitoring is enabled. In the illustrated example, the registration data controller 177 of the central facility 170 verifies that the demographic information is complete and stores an indication that monitoring should be enabled for the user (block 970). In some examples, the recruitment coordinator 270 stores a monitoring instruction in the data store 150 indicating that monitoring is enabled. Control then terminates, and the example instrumented application 135 continues to perform a function unrelated to audience measurement.

Figure 10:
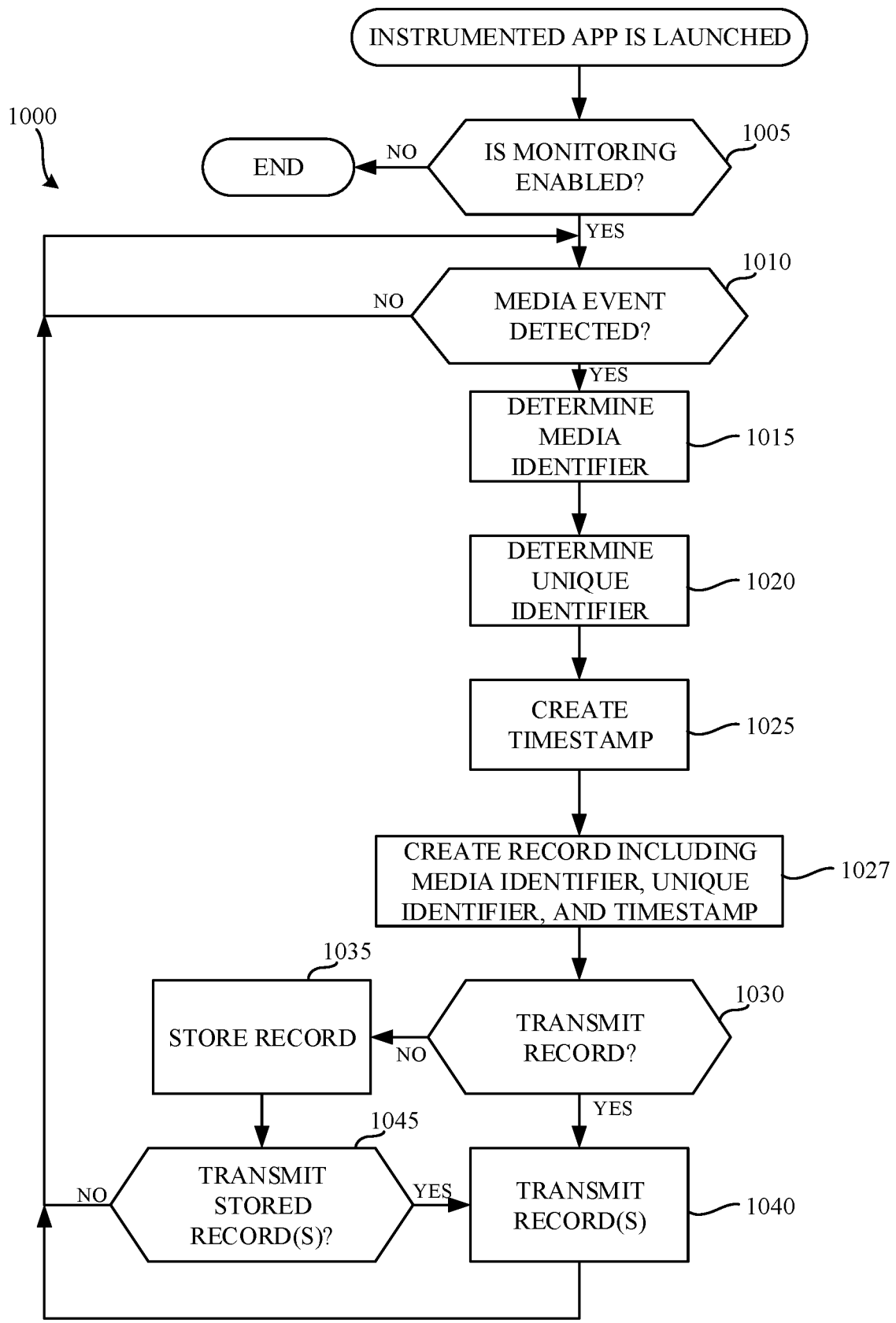
FIG. 10 is a flowchart representative of example machine-readable instructions that may be executed to implement the example instrumented application of FIGS. 1 and/or 2.

FIG. 10 is a flowchart representative of example machine-readable instructions 1000 that may be executed to implement a monitoring enabled (e.g., instrumented) app such as the example instrumented application 135 of FIGS. 1 and/or 2. The example program 1000 of FIG. 10 begins at block 1005 when the monitoring data controller 240 determines if monitoring is enabled (block 1005). In the illustrated example, the monitoring data controller 240 determines whether monitoring is enabled by requesting monitoring instructions from the central facility 170. Monitoring may be enabled when, for example, the user has been selected to be a panelist and has completed all recruitment requirements (e.g., agreeing to become a panelist, providing demographic information, etc.). Alternatively, the monitoring data controller 240 may determine whether monitoring is enabled by checking the data store 150 to see if a monitoring instruction has been stored therein. The example monitoring data controller 240 may store the monitoring instruction in the data store 150 after receiving the monitoring instructions from the central facility. In some examples, the monitoring instruction is a binary indicator indicating that media monitoring should be enabled. However, in some other examples, the consent identifier is a user and/or panelist identifier. In some other examples, the monitoring instruction is a date until which monitoring is to be enabled. Monitoring agreements may be limited in time duration (e.g., three months, one year, etc.). After the expiration of the monitoring agreement, the monitoring activities are disabled. In some examples, a new monitoring offer may be presented to the user. However, in some examples, the user may not be requested to continue with a new monitoring agreement (e.g., a forced turn-over). A forced turn-over may be used to, for example, remove users who did not routinely use the instrumented application, reduce financial obligations of incentives promised to users, etc.

If monitoring is not enabled (block 1005), the process 1000 terminates, as the user is not a panelist and/or has not given their consent to be monitored. If monitoring is enabled (block 1005), the media monitor 220 waits until a media event is detected. Media events may be triggered when, for example, the media presenter 210 begins playing a video, the media presenter 210 displays an image (e.g., an advertisement), the instrumented application 135 is restarted, etc. If a media event is not detected (block 1010), the media monitor 220 continues to wait for a media event.

While in the illustrated example monitoring does not occur unless permission and/or consent is given, in some examples, monitoring may occur regardless of whether permission and/or consent is given. However, the collected monitoring information is not transmitted to the central facility 170. That is, the monitoring functionality of the instrumented application 135 may operate, but not transmit collected monitoring data unless consent is received and/or not transmit collected monitoring data until the user has agreed to become a panelist. Once consent is received (e.g., by detection of a monitoring instruction), the monitoring data controller 240 may transmit the previously collected monitoring information to the central facility 170 (as well as future monitoring information). In other words, the monitoring instruction may be retroactive in that it authorizes previous monitoring activity.

If a media event is detected (block 1010), the media monitor 220 determines a media identifier associated with media presented by the instrumented application 135 (block 1015). In the illustrated example, the media monitor 220 extracts media-identifying metadata from an ID3 tag transmitted in association with the presented media (see, for example, U.S. patent application Ser. No. 13/341,646, U.S. patent application Ser. No. 13/341,661, U.S. patent application Ser. No. 13/443,596, U.S. patent application Ser. No. 13/455,961, U.S. patent application Ser. No. 13/472,170, U.S. patent application Ser. No. 13/793,991, U.S. patent application Ser. No. 13/793,974, and U.S. patent application Ser. No. 13/793,983). In some examples, the media monitor 220 determines the media identifier by extracting, decoding, etc. a code, a signature, and/or a watermark embedded in the presented media.

The monitoring data controller 240 of the illustrated example retrieves the unique identifier from the data store 150 (block 1020). In the illustrated example, the unique identifier is an encrypted panelist identifier. Encrypting the unique identifier ensures that the application 135 does not have access to sensitive user information.

The media monitor 220 then creates a timestamp (block 1025). Timestamping (e.g., recording a time that an event occurred) enables accurate identification and/or correlation of media that was presented and/or the time that it was presented with the user(s) using the media device at that time.

The monitoring data controller 240 of the illustrated example then creates a record including the media identifier (e.g., the media identifier obtained at block 1015), the unique identifier (of block 1020), and the timestamp (of block 1025). In the illustrated example, the record is formatted as a comma separated value (CSV) record. However, any other type(s) and/or format(s) of record may additionally or alternatively be used. For example, the record may be formatted as an extensible markup language (XML) record.

The example monitoring data controller 240 of the illustrated example determines whether the record should be transmitted to the example monitoring data receiver 179 of the central facility 170 (block 1030). In some examples, records are streamed to the central facility 170 as they are identified and/or created. If the example monitoring data controller 240 is to transmit the record to the central facility 170 (block 1030), the monitoring data controller 240 transmits the record to the example monitoring data receiver 179 of the example central facility 170 (block 1040). In some examples, records are stored in the data store 150 so that they may be transmitted in a single transmission (e.g., a single HTTP request, a single file transfer protocol (FTP) command, etc.). If the example monitoring data controller 240 is not to transmit the record to the central facility 170 (block 1030), the record is stored in the data store 150 by the monitoring data controller 240 (block 1035).

The monitoring data controller 240 of the illustrated example determines whether a storage threshold of the data store 150 has been met or exceeded (block 1045). In the illustrated example, the threshold represents an amount of time that records may be stored in the data store 150 before being transmitted to the central facility 170. Records may be stored for, for example, one hour, one day, one week, one month, etc. However, any other type of threshold may additionally or alternatively be used such as, for example, a storage limit (e.g., 1 kB, 64 kB, 1 MB, etc.). If the storage threshold is exceeded, the monitoring data controller 240 transmits the stored records to the central facility 170 (block 440). The media monitor 220 then continues to wait for media events from the media presenter 210 (block 1010). If the storage threshold is not exceeded, the media monitor 220 continues to wait for media events from the media presenter 210 (block 1010).

While in the illustrated example, a storage threshold is used to determine when to transmit monitoring information, any other way of making such a determination may additionally or alternatively be used. For example, monitoring information may be transmitted to the central facility 170 at a fixed interval (e.g., 30 minutes, 3 hours, 1 day, 1 week, etc.), monitoring information may be transmitted in response to an external event (e.g., user pushes a synchronize button, the central facility 170 requests updated monitoring information, the instrumented application 135 is started, the instrumented application 135 is exited, etc.).

Figure 11:
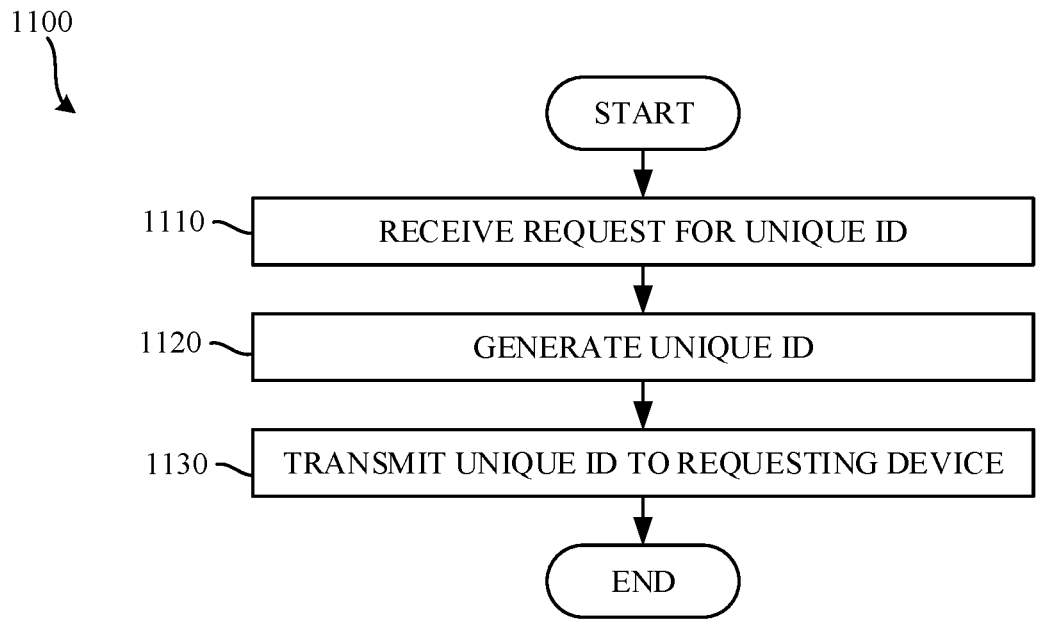
FIG. 11 is a flowchart representative of example machine-readable instructions that may be executed to implement the example central facility of FIG. 1.

FIG. 11 is a flowchart representative of example machine-readable instructions 1100 that may be executed to implement the example central facility of FIG. 1. The example program 1100 of FIG. 11 begins at block 1110 when the registration data controller 177 receives a request for a unique identifier (block 1110). In the illustrated example, the request is received via the HTTP interface 175. However, any other interface for receiving such a request may additionally or alternatively be used. The example unique identifier generator 186 then generates a unique identifier (block 1120). In some examples, the generated unique identifier is stored in the data store 176. In the illustrated example, the generated unique identifier is a serial number used to uniquely identify the user and/or device. However, in some examples, the unique identifier may be any other identifier such as, for example, a username, an e-mail address, etc. The example registration data controller 177 then transmits the unique identifier to the requesting device (block 1130).

Figure 12:
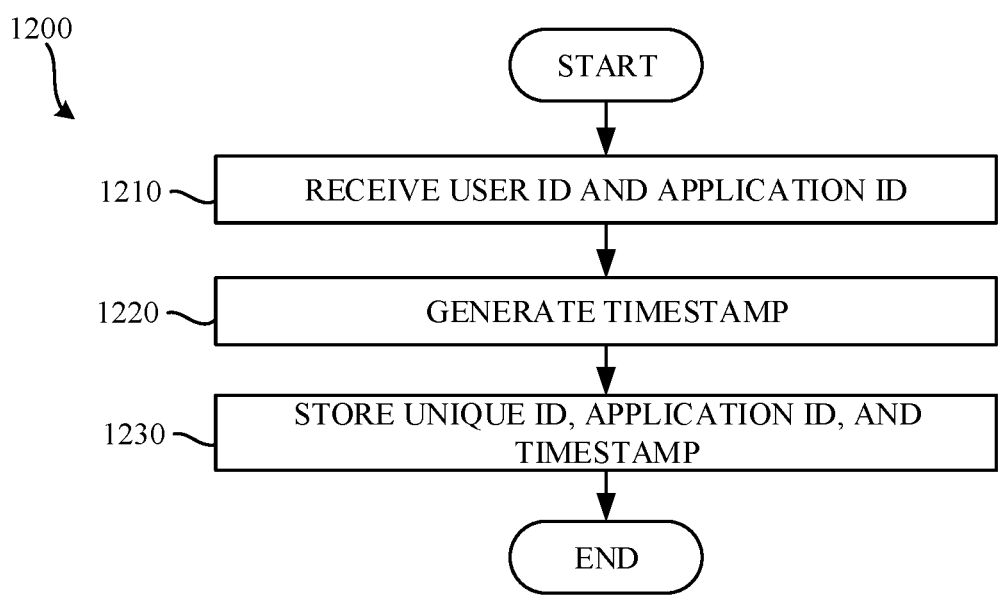
FIG. 12 is a flowchart representative of example machine-readable instructions that may be executed to implement the example central facility of FIG. 1.

FIG. 12 is a flowchart representative of example machine-readable instructions 1200 that may be executed to implement the example central facility of FIG. 1. The example program 1200 of FIG. 12 begins at block 1210 when the example registration data controller 177 receives a unique identifier and application identifier from the recruitment controller 270 (block 1210). In the illustrated example, the request is received via the HTTP interface 175. However, any other interface for receiving such a request may additionally or alternatively be used. The example registration data controller 177 then generates a timestamp of when the unique identifier and application identifier pair were received (block 1220). The example registration data controller 177 then stores the unique identifier, the application identifier, and the timestamp (block 1230). Such storage may be similar to the table 500 of FIG. 5.

Figure 13:
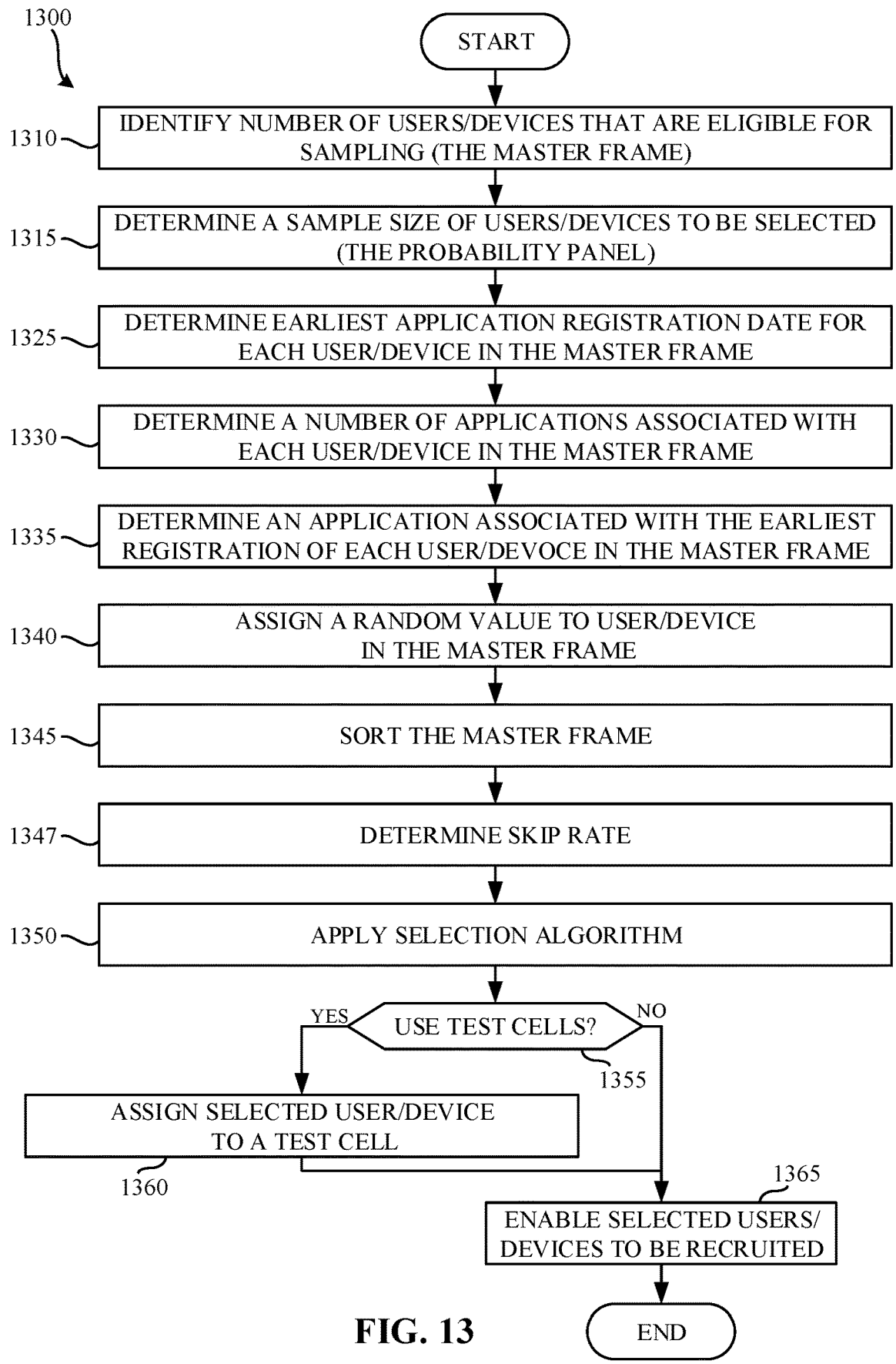
FIG. 13 is a flowchart representative of example machine-readable instructions that may be executed to implement the example central facility of FIG. 1.

FIG. 13 is a flowchart representative of example machine-readable instructions 1300 that may be executed to implement the example central facility of FIG. 1. The example program 1300 of FIG. 13 begins at block 1310 when the panel creator 182 selects users to be recruited to become panelists. In the illustrated example, the example panel creator 182 obtains a number of devices that are eligible for sampling (block 1310). For example, the eligible number of devices may reflect active media devices within the master frame (e.g., media devices that have launched at least one instrumented application, that have not been previously given a chance of selection (e.g., a recruitment interface has not been displayed), etc.). In some examples, the number of eligible devices for sampling is limited to those devices that have contacted the audience measurement entity in the past ninety days (e.g., as a result of the launch of an instrumented application). From the master frame, the panel creator 182 determines a sample size of media devices to be selected to be recruited (block 1315). In some examples, the master frame may represent ten thousand media devices. The panel creator 182 may determine the sample size based on, for example, a minimum threshold of devices to be sampled to meet statistical requirements for accurate sampling, a maximum threshold of incentives that may be offered, etc. As disclosed herein, the number of devices to be selected is referred to as a probability panel. The probability panel is a subset of the master frame, and corresponds to users and/or devices who have been selected to be recruited. In examples disclosed herein, the probability panel includes four thousand and two hundred users. However, any number of users may be included in the probability panel.

Next, the example panel creator 182 determines the earliest application registration date for each user and/or device included in the master frame (block 1325). The example panel creator 182 then determines a number of applications associated with each user and/or device included in the master frame (block 1330). The example panel creator 182 then determines an application associated with the earliest registration for each user and/or device included in the master frame (block 1335). The example panel creator 182 then assigns a random value to each user and/or device included in the master frame (block 1340). The earliest application registration date, the number of applications associated with the user and/or device, the application associated with the earliest registration, and the random value are used by the panel creator 182 to sort the master frame to form a sorted master frame (block 1345).

The panel creator 182 then determines a skip rate (S) to be used when selecting users and/or devices of the sorted master frame (block 1345). In the illustrated example, the skip rate is equal to the number of users and/or devices in the master frame divided by the number of users and/or devices to be included in the probability panel. In some examples, the skip rate is rounded down to the nearest hundredth. Accordingly, when the example master frame includes ten thousand users and/or devices, and the desired probability panel size is four thousand and two hundred users and/or devices, the following skip rate may be determined:

$$S = \frac{DEVICES_{MasterFrame}}{DEVICES_{ProbabilityPanel}} = \frac{10,000}{4,200} = 2.38$$

Next, the panel creator 182 applies a selection algorithm using the skip rate to users and/or devices within the master frame to be included in the probability panel. In the illustrated example, the selection algorithm includes generating a random number (RN) between zero and the skip rate. The random number is rounded down to the nearest hundredth, and then is sequentially incremented by the skip rate a total of n−1 times, accounting for each user to be selected. In selecting the users and/or devices, the following formula may be used:

$$X_i = \text{Integer}(RN + S^*(i-1) - 0.01) + 1$$

Based on the above equation, the panel creator 182 selects each user and/or device "i" to be included in the probability panel from the sorted master frame. If, for example, the example master frame includes ten thousand users and/or devices, the desired probability panel size is four thousand and two hundred users and/or devices, and the random number is determined to be 2.03, the following selection would result:

$$X_1 = \text{Integer}(2.03 - 0.01) + 1 = 3$$

$$X_2 = \text{Integer}(2.03 + (2.38*1) - 0.01) + 1 = 5$$

$$X_3 = \text{Integer}(2.03 + (2.38*2) - 0.01) + 1 = 7$$

-continued $$X_4 = \text{Integer}(2.03 + (2.38*3) - 0.01) + 1 = 10$$

$$X_5 = \text{Integer}(2.03 + (2.38*4) - 0.01) + 1 = 12$$

...

$$X_{4200} = \text{Integer}(2.03 + (2.38*4199) - 0.01) + 1 = 9996$$

Accordingly, the first selected user and/or device of the probability panel is the third user and/or device in the sorted master frame, the second selected user and/or device of the probability panel is the fifth user and/or device in the sorted master frame, etc. As such, there is an even distribution of users and/or devices selected to be in the probability panel throughout the master frame. While in the illustrated example the probability panel is created by sorting the master frame based on a number of features, any other way of selecting users and/or devices (e.g., the probability panel) from a list of users and/or devices (e.g., the master frame) may additionally or alternatively be used. For example, instead of rounding calculated values down and adding one, calculated values may be rounded up to the nearest integer. Moreover, the master frame may be filtered to include only users and/or devices who have used a particular instrumented application, may be filtered to include only users and/or devices who have a particular type of device (e.g., an Apple iPad®), may be filtered to include only users and/or devices who are located in a particular geographic area, etc.

The example panel creator 182 then determines whether test cells are to be used (block 1355). Test cells enable multiple recruitment interfaces to be presented to users and/or devices within the probability panel, thereby enabling the monitoring entity to identify effectiveness of various recruitment interfaces. However, in some examples, test cells may not be used because, for example, the most effective recruitment interface has already been identified. If test cells are to be used, the example panel creator 182 assigns each of the users and/or devices in the probability panel to one of a plurality of test cells. To assign each user and/or device to a test cell, a random value is generated equal to an integer from one to the number of test cells. Using the selection order from the selection algorithm, the panel creator assigns the first selected user and/or device to the test cell associated with the random value. The random value is incremented by one and applied to the next selected user and/or device. This process is repeated until all selected users and/or devices of the probability panel have been assigned to a test cell. The example panel creator 182 stores the assignment in the data store 176 in a format similar to, for example, the example table 700 of FIG. 7.

Finally, the panel creator 182 updates the user registration information to enable recruitment of the selected users and/or devices (block 1365). Accordingly, when the recruitment coordinator 270 of the instrumented application 135 determines whether to display the recruitment interface, the appropriate action can be taken.

Figure 14:
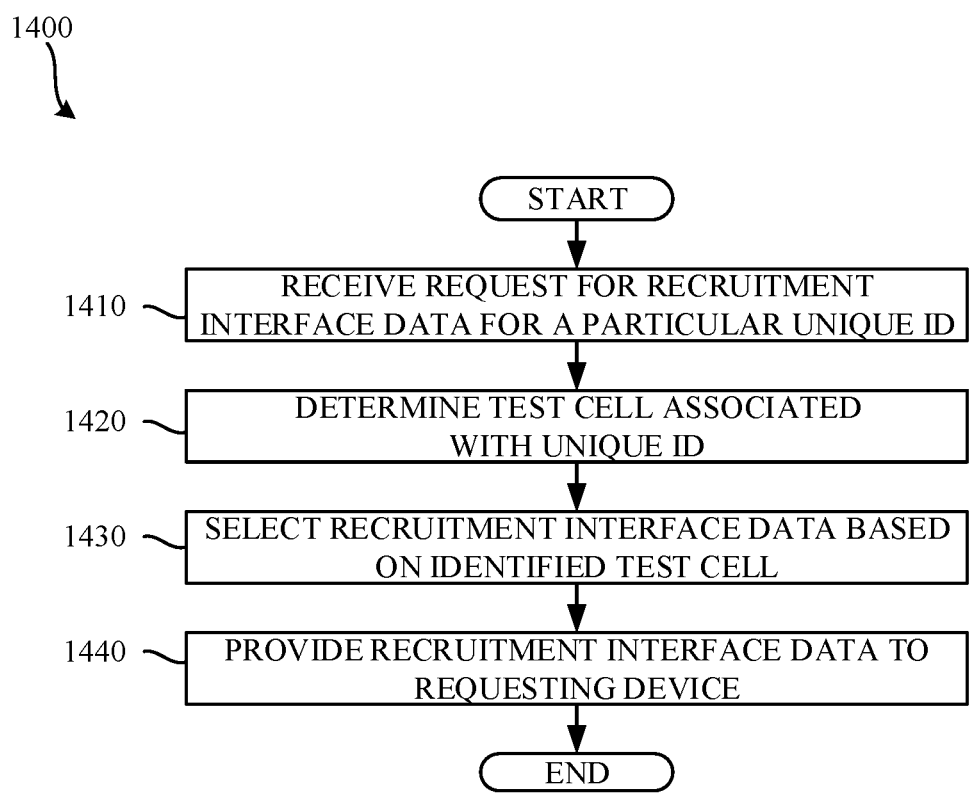
FIG. 14 is a flowchart representative of example machine-readable instructions that may be executed to implement the example central facility of FIG. 1.

FIG. 14 is a flowchart representative of example machine-readable instructions 1400 that may be executed to implement the example central facility of FIG. 1. The example program 1400 of FIG. 14 begins at block 1410 when the registration data controller 177 receives a request for recruitment interface data from the recruitment controller 270 for a particular user and/or device (block 1410). In the illustrated example, the request is received via the HTTP interface 175. However, any other interface for receiving such a request may additionally or alternatively be used. If the user and/or device is to be recruited, the registration data controller 177 determines a test cell associated with the user and/or device based on the unique identifier (block 1420). Based on the identified test cell, the registration data controller selects recruitment interface data (e.g., information about how the recruitment interface should be displayed, incentives that should be offered, demographic data that should be requested, etc.) (block 1430). The registration data controller 177 then provides the selected recruitment interface data to the recruitment controller 270 of the requesting media device 130 (block 1440). The example program 1400 of FIG. 14 then terminates.

Figure 15:
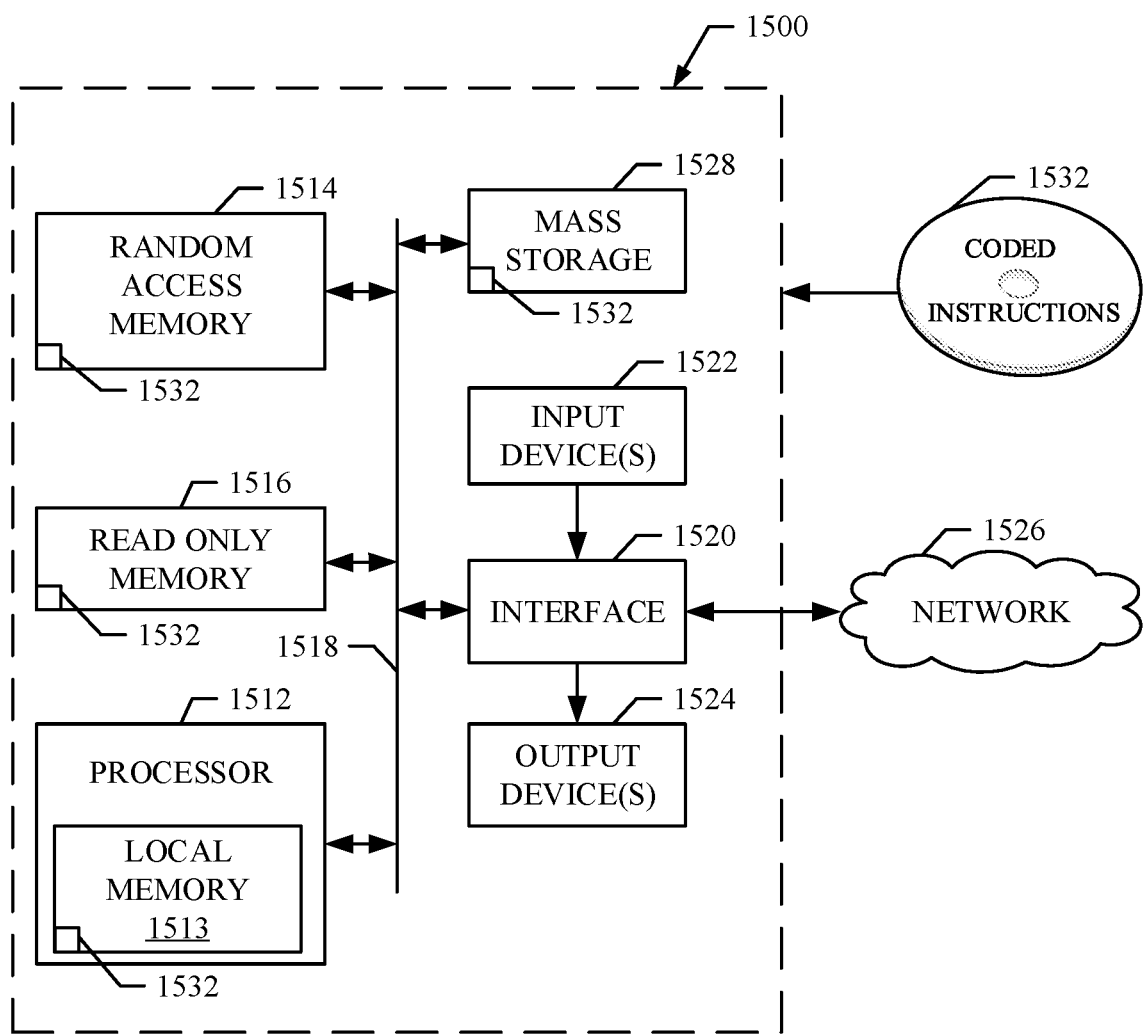
FIG. 15 is a block diagram of an example processor platform capable of executing the example machine-readable instructions of FIGS. 9, 10, 11, 12, 13, and/or 14 to implement the example instrumented application of FIGS. 1 and/or 2, and/or the example central facility of FIG. 1.

FIG. 15 is a block diagram of an example processor platform 1500 capable of executing the instructions of FIGS. 9, 10, 11, 12, 13, and/or 14 to implement the central facility 170 of FIG. 1 and/or the example instrumented application 135 of FIGS. 1 and/or 2. The processor platform 1500 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 9, 10, 11, 12, 13, and/or 14 may be stored in the mass storage device 1528, in the volatile memory 1514, in the non-volatile memory 1516, and/or on a removable tangible computer readable storage medium such as a CD or DVD.

From the foregoing, it will be appreciated that methods, apparatus and articles of manufacture have been disclosed to enable a monitoring entity to assemble a master frame including all media devices that have launched at least one instrumented application, and to understand which instrumented application(s) are on each media device. From the master frame, a probability panel can be created and selected users may be requested to join a media monitoring panel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory machine readable medium comprising instructions which, when executed, cause a machine to at least:
provide monitoring instructions to a media provider for creation of an instrumented application;
receive a unique identifier and an application identifier from a media device executing the instrumented application, the unique identifier and the application identifier received without collecting personally identifiable information;
create a master frame corresponding to media devices that have executed the instrumented application;
sort the master frame based on at least one of a date of installation of the application at the media device, an identifier associated with the application installed at the media device, or a number of instrumented applications installed on the media device;
assign the media device from the master frame into a first test cell based on a skip rate;
select a first recruitment interface associated with the first test cell, the first recruitment interface different from a second recruitment interface associated with a second test cell; and
instruct the instrumented application to, in response to the instrumented application being executed for a first time after a threshold period of time since an initial execution of the instrumented application has elapsed, display the first recruitment interface to a user associated with the media device requesting the user to join a panel.

2. The at least one non-transitory machine readable medium of claim 1, wherein the instructions, when executed, further cause the machine to receive monitoring data from the instrumented application after the user has agreed to become a panelist.

3. The at least one non-transitory machine readable medium of claim 1, wherein the instructions, when executed, further cause the machine to generate the unique identifier to be used by the media device.

4. The at least one non-transitory machine readable medium of claim 3, wherein the instructions, when executed, further cause the machine to transmit the unique identifier to the media device.

5. The at least one non-transitory machine readable medium of claim 1, wherein the application identifier is assigned to the instrumented application by at least one of the media provider or an application developer.

6. The at least one non-transitory machine readable medium of claim 1, wherein the assigning of the media device to into the first test cell is further based on a random value, wherein the random value is less than or equal to the skip rate and greater than or equal to zero.

7. The at least one non-transitory machine readable medium of claim 1, wherein the skip rate is based on a count of media devices in the master frame divided by a desired number of media devices for the panel.

8. A method for creation of a panel, the method comprising:
provding monitoring instructions to a media provider for creation of an instrumented application;
receiving a unique identifier and an application identifier from a media device executing the instrumented application, the unique identifier and the application identifier received without collecting personally identifiable information;
creating a master frame corresponding to media devices that have executed the instrumented application;
sorting the master frame based on at least one of a date of installation of the application at the media device, an identifier associated with the application installed at the media device, or a number of instrumented applications installed on the media device;
assigning the media device from the master frame into a first test cell based on a skip rate;
selecting a first recruitment interface associated with the first test cell, the first recruitment interface different from a second recruitment interface associated with a second test cell; and
instructing the instrumented application to, in response to the instrumented application being executed for a first time after a threshold period of time since an initial execution of the instrumented application has elapsed, display the first recruitment interface to a user associated with the media device requesting the user to join the panel.

9. The method of claim 8, further including receiving monitoring data from the instrumented application after the user has agreed to become a panelist.

10. The method of claim 8, further including generating the unique identifier to be used by the media device.

11. The method of claim 10, further including transmitting the unique identifier to the media device.

12. The method of claim 8, wherein the application identifier is assigned to the instrumented application by at least one of the media provider or an application developer.

13. The method of claim 8, wherein the assigning of the media device to into the first test cell is further based on a random value, wherein the random value is less than or equal to the skip rate and greater than or equal to zero.

14. The method of claim 8, wherein the skip rate is based on a count of media devices in the master frame divided by a desired number of media devices for the panel.

15. An apparatus for creation of a panel, the apparatus comprising:
memory;
instructions; and
at least one processor to execute the instructions to cause the at least one processor to at least:
provide monitoring instructions to a media provider for creation of an instrumented application;
receive a unique identifier and an application identifier from a media device executing the instrumented application, the unique identifier and the application identifier received without collecting personally identifiable information;
create a master frame corresponding to media devices that have executed the instrumented application;
sort the master frame based on at least one of a date of installation of the application at the media device, an identifier associated with the application installed at the media device, or a number of instrumented applications installed on the media device;
assign the media device from the master frame into a first test cell based on a skip rate;
select a first recruitment interface associated with the first test cell, the first recruitment interface different from a second recruitment interface associated with a second test cell; and
instruct the instrumented application to, in response to the instrumented application being executed for a first time after a threshold period of time since an initial execution of the instrumented application has elapsed, display the first recruitment interface to a user associated with the media device requesting the user to join a panel.

16. The apparatus of claim 15, wherein the processor is further to receive monitoring data from the instrumented application after the user has agreed to become a panelist.

17. The apparatus of claim 15, wherein the processor is further to generate the unique identifier to be used by the media device.

18. The apparatus of claim 17, wherein the processor is further to transmit the unique identifier to the media device.

19. The apparatus of claim 15, wherein the application identifier is assigned to the instrumented application by at least one of the media provider or an application developer.

20. The apparatus of claim 15, wherein the assigning of the media device to into the first test cell is further based on a random value, wherein the random value is less than or equal to the skip rate and greater than or equal to zero.

* * * * *

UNITED STATES PATENT AND TRADEMARK OFFICE
CERTIFICATE OF CORRECTION

PATENT NO. : 11,457,282 B2
APPLICATION NO. : 17/195365
DATED : September 27, 2022
INVENTOR(S) : Borawski et al.

It is certified that error appears in the above-identified patent and that said Letters Patent is hereby corrected as shown below:

In the Drawings

Sheet 10 of 12, in block 1335 under Figure 13, delete "DEVOCE" and insert --"DEVICE"--.

Signed and Sealed this
Twenty-second Day of November, 2022

Katherine Kelly Vidal
*Director of the United States Patent and Trademark Office*